(12) United States Patent
Isoda et al.

(10) Patent No.: US 10,652,499 B2
(45) Date of Patent: May 12, 2020

(54) IMAGE CAPTURING APPARATUS, IMAGE CAPTURING SYSTEM, MOVING OBJECT, AND SEMICONDUCTOR CHIP HAVING SIGNAL PROCESSING CIRCUITS IN TWO-DIMENSIONAL FORM

(71) Applicant: CANON KABUSHIKI KAISHA, Tokyo (JP)

(72) Inventors: Naoki Isoda, Tokyo (JP); Hirofumi Totsuka, Fujisawa (JP); Daisuke Yoshida, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/142,949

(22) Filed: Sep. 26, 2018

(65) Prior Publication Data

US 2019/0104271 A1 Apr. 4, 2019

(30) Foreign Application Priority Data

Sep. 29, 2017 (JP) ................................ 2017-192049

(51) Int. Cl.
*H04N 5/369* (2011.01)
*H04N 5/378* (2011.01)
*H04N 5/3745* (2011.01)
*H04N 5/376* (2011.01)

(52) U.S. Cl.
CPC ............ *H04N 5/379* (2018.08); *H04N 5/376* (2013.01); *H04N 5/378* (2013.01); *H04N 5/37457* (2013.01)

(58) Field of Classification Search
CPC .... H04N 5/379; H04N 5/378; H04N 5/37457; H04N 5/376

USPC ........ 348/294–324; 250/208.1; 257/290–292
See application file for complete search history.

(56) References Cited

U.S. PATENT DOCUMENTS

2014/0368707 A1* 12/2014 Ikeda .................... H04N 5/378
348/301
2016/0344959 A1* 11/2016 Mabuchi ........... H01L 27/14632

FOREIGN PATENT DOCUMENTS

| JP | 2015-002469 A | | 1/2015 |
| JP | 2016-171399 A | | 9/2016 |
| JP | 2016171399 A | * | 9/2016 |

* cited by examiner

*Primary Examiner* — Yogesh K Aggarwal
(74) *Attorney, Agent, or Firm* — Canon U.S.A., Inc. IP Division

(57) ABSTRACT

An image capturing apparatus includes a first chip and a second chip. The first chip includes a plurality of pixels. The second chip is stacked on the first chip and includes a plurality of signal processing circuits arranged in a two-dimensional form. Each signal processing circuit includes a first selection circuit, a plurality of amplifier circuits, and an analog-to-digital conversion unit. The first selection circuit includes a plurality of input nodes, a plurality of output nodes, and is configured such that a signal output from a pixel and input to one of the plurality of input nodes is selectively output to one of the plurality of output nodes. The plurality of amplifier circuits respectively are connected to the plurality of output nodes of the first selection circuit. The analog-to-digital conversion unit is configured to convert a plurality of output signals output from the plurality of amplifier circuits.

20 Claims, 18 Drawing Sheets

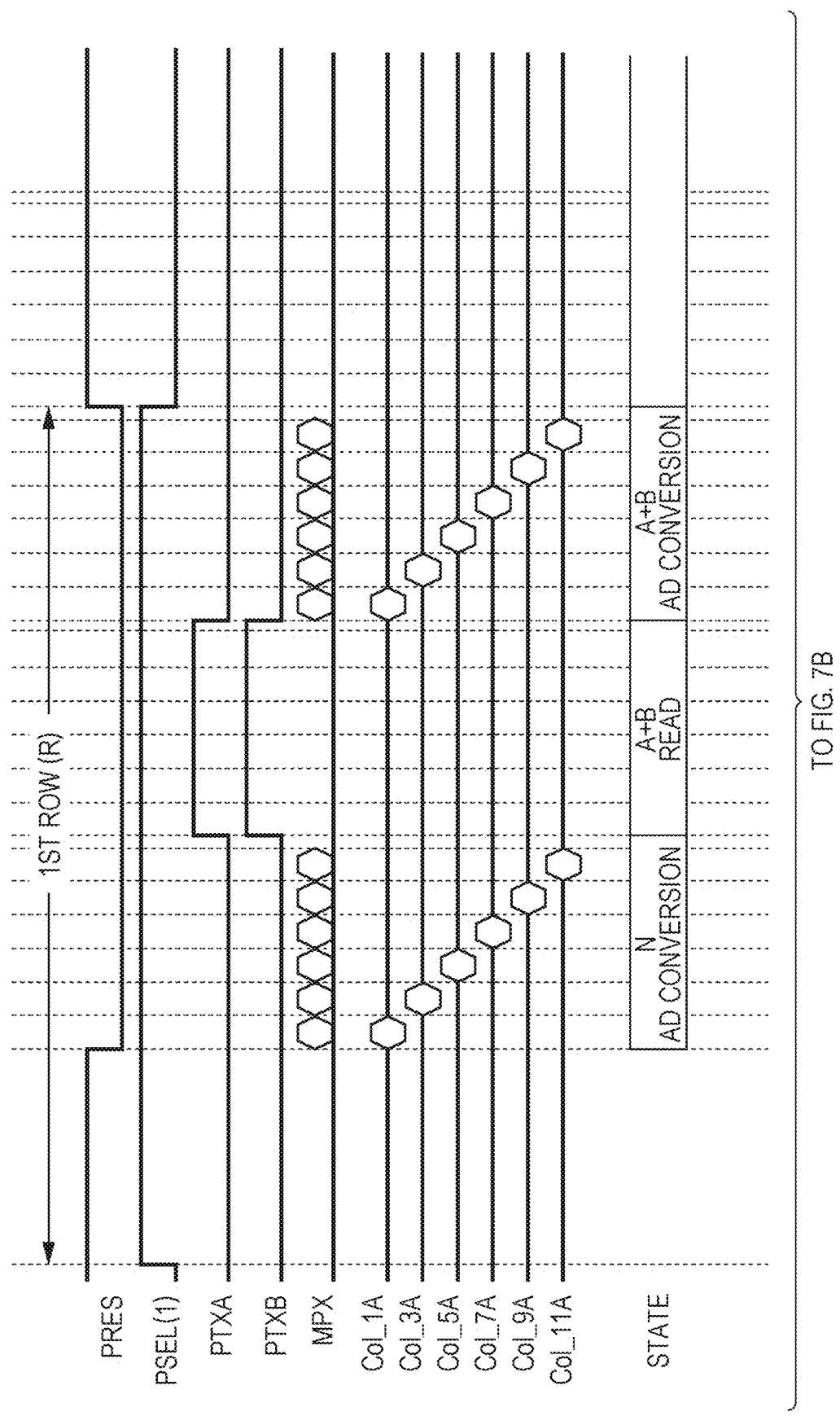

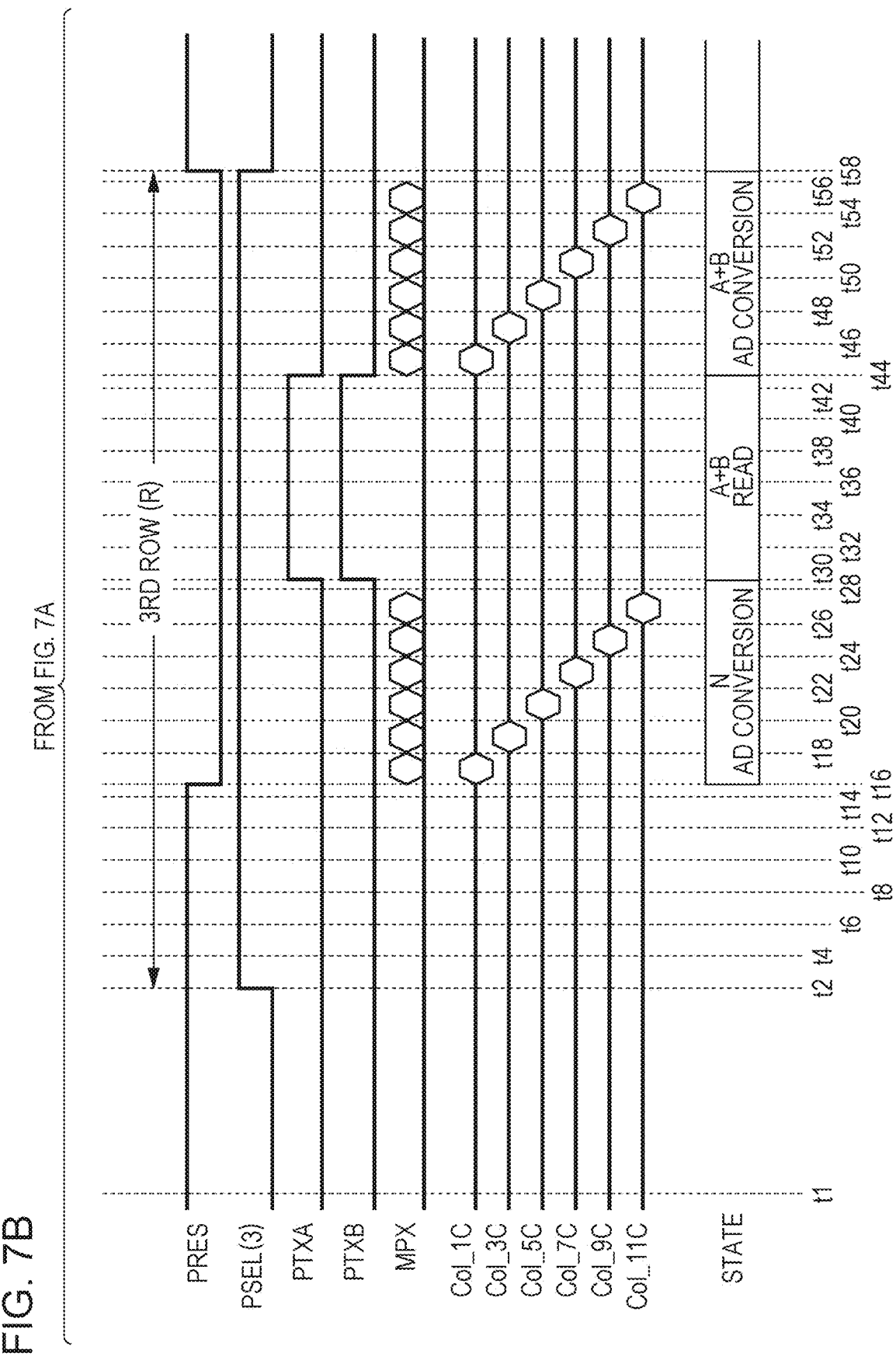

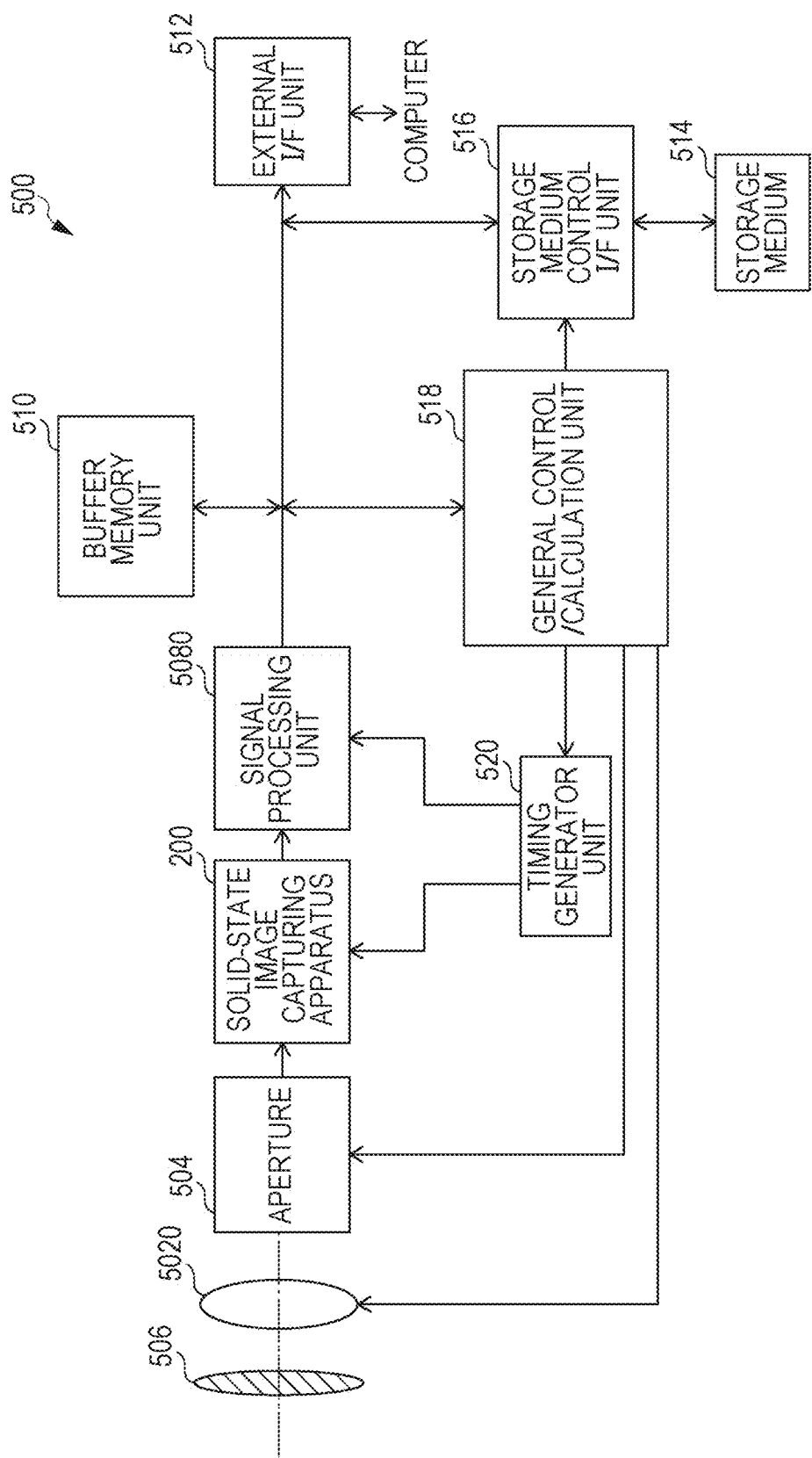

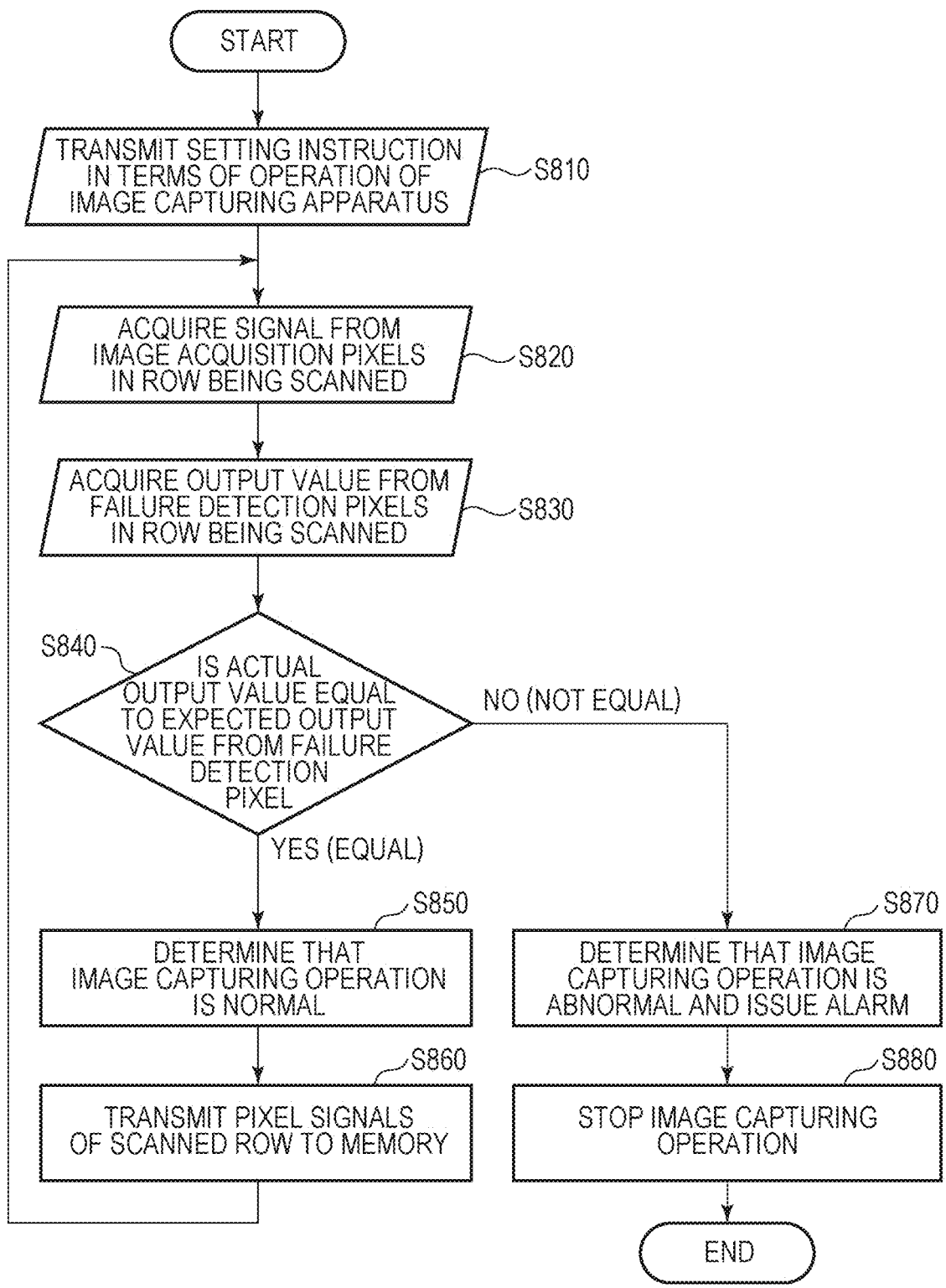

IMAGE CAPTURING APPARATUS, IMAGE CAPTURING SYSTEM, MOVING OBJECT, AND SEMICONDUCTOR CHIP HAVING SIGNAL PROCESSING CIRCUITS IN TWO-DIMENSIONAL FORM

BACKGROUND OF THE INVENTION

Field of the Invention

The present disclosure related to an image capturing apparatus, an image capturing system, a moving object, and a semiconductor chip.

Description of the Related Art

There is a known image capturing apparatus including a plurality of pixels arranged along a plurality of rows and a plurality of columns. Japanese Patent Laid-Open No. 2016-171399 (hereinafter referred to as PTL-1) discloses an image capturing apparatus in which a first chip and a second chip are disposed in a multilayer fashion wherein the first chip includes a plurality of pixels and the second chip includes an analog-to-digital conversion unit (hereinafter referred to as the AD conversion unit) that perform an analog-digital conversion (hereinafter referred to as the AD conversion) on signals output from the pixels. The image capturing apparatus disclosed in PTL-1 includes a plurality of signal lines provided corresponding to a plurality of pixels arranged in one column. The image capturing apparatus also includes a connection circuit configured to select one signal line from the plurality of signal lines and connect the selected signal line to the AD conversion unit.

Japanese Patent Laid-Open No. 2015-002469 (hereinafter referred to as PTL-2) discloses a configuration in which one AD conversion unit is shared by a plurality of signal lines, and an inverting amplifier forming an addition/subtraction circuit is disposed between the AD conversion unit and the signal line (FIG. 9 in PTL-2).

SUMMARY OF THE INVENTION

According to one embodiment, an image capturing apparatus includes a first chip and a second chip. The first chip includes a plurality of pixels. The second chip is stacked on the first chip and includes a plurality of signal processing circuits arranged in a two-dimensional form. Each of the plurality of signal processing circuits includes a first selection circuit, a plurality of amplifier circuits, and an analog-to-digital conversion unit. The first selection circuit includes a plurality of input nodes and a plurality of output nodes and is configured such that a signal input from one of the pixels to one of the plurality of input nodes is selectively output to one of the plurality of output nodes. The plurality of amplifier circuits are respectively connected to the plurality of output nodes. The analog-to-digital conversion unit is configured to convert a plurality of output signals output from the plurality of amplifier circuits.

According to another embodiment, there is provided a semiconductor chip for being stacked on a chip including a plurality of pixels. The semiconductor chip includes a plurality of signal processing circuits arranged in a two-dimensional form. Each of the plurality of signal processing circuits includes a first selection circuit, a plurality of amplifier circuits, and an analog-to-digital conversion unit. The first selection circuit includes a plurality of input nodes and a plurality of output nodes and is configured such that a signal input from one of the pixels to one of the plurality of input nodes is selectively output to one of the plurality of output nodes. The plurality of amplifier circuits are respectively connected to the plurality of output nodes. The analog-to-digital conversion unit configured to convert a plurality of output signals output from the plurality of amplifier circuits.

Further features of the disclosure will become apparent from the following description of exemplary embodiments with reference to the attached drawings.

BRIEF DESCRIPTION OF THE DRAWINGS

FIGS. 7A and 7B are diagrams illustrating an operation of an image capturing apparatus.

FIG. 14 is a diagram illustrating a configuration of an image capturing system.

FIG. 16 is a diagram illustrating an operation of an image capturing system.

DESCRIPTION OF THE EMBODIMENTS

According to one or more embodiments, it is possible to achieve an improvement in an SN ratio and an increase in a signal reading rate.

A reduction in the SN ratio can occur in an image capturing apparatus. A source follower circuit formed with an amplifier transistor Tb in a pixel and a current source CS is connected to an AD conversion unit via a connection circuit. In general, the source follower circuit has a small output swing and has a gain nearly equal to 1. Therefore, if noise occurs in the AD conversion unit or a selection circuit, a significant reduction in the SN ratio occurs. In the image capturing apparatus, it is preferable to achieve an increase in signal reading rate.

Embodiments are described below with reference to drawings. In the following description, it is assumed that every transistor is of an N-type, unless otherwise noted. However, in the embodiments described below, the transistor type is not limited to the N-type, but P-type transistors may be used as required. In this case, potentials of gates, sources, and drains of transistors may be different from those described in the following embodiments. For example, for a transistor functioning as a switch, the potential applied to the gate thereof may be reversed in terms of high and low levels as opposed to those described in the following embodiments.

First Embodiment

Overall Configuration of Image Capturing Apparatus

Figure 1:
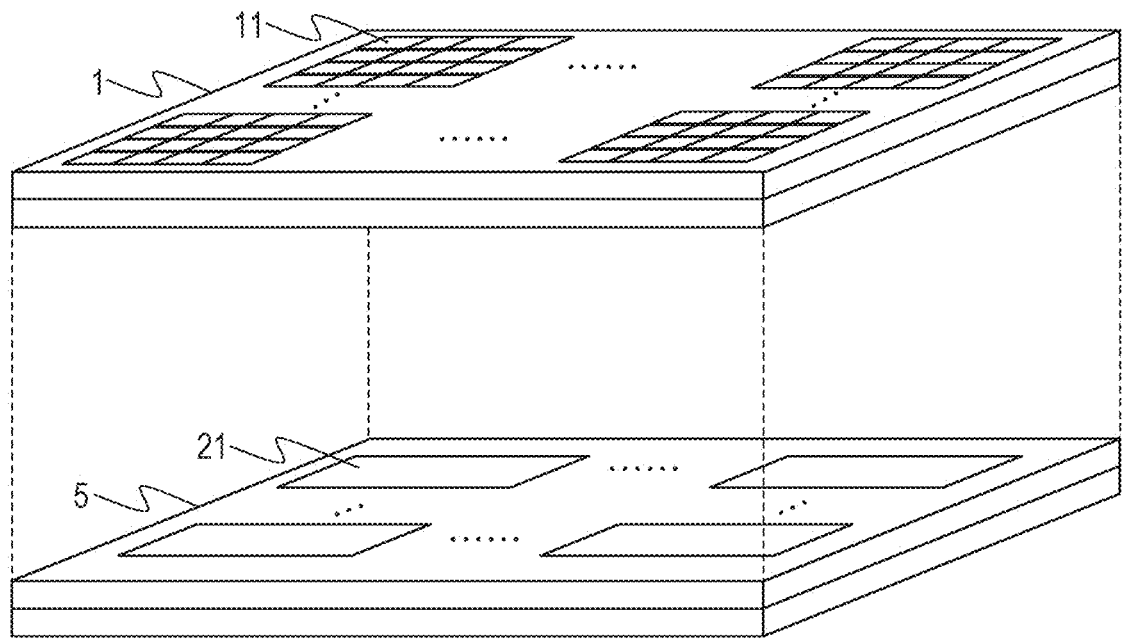
FIG. 1 is a diagram illustrating a configuration of an image capturing apparatus.

FIG. 1 is a diagram illustrating a first chip 1 and a second chip 5 included in an image capturing apparatus according to a first embodiment. The first chip 1 and the second chip 5 are disposed in a multilayer form. On the first chip 1, pixels 11 are disposed along a plurality of rows and a plurality of columns. On the second chip 5, signal processing circuits 21 are disposed in a two-dimensional form along a plurality of rows and a plurality of columns Although only pixels 11 and the signal processing circuits 21 are shown here, other elements including control lines for controlling the pixels 11 and signal lines for transmitting signals output from the pixels 11 are also disposed as required on the first chip 1. Furthermore, drive circuits such as a vertical scanning circuit, a timing generator, and the like are disposed as required on the first chip 1 or the second chip 5.

Layout of Pixels and Signal Processing Circuits as Seen in Plan View

Figure 2:
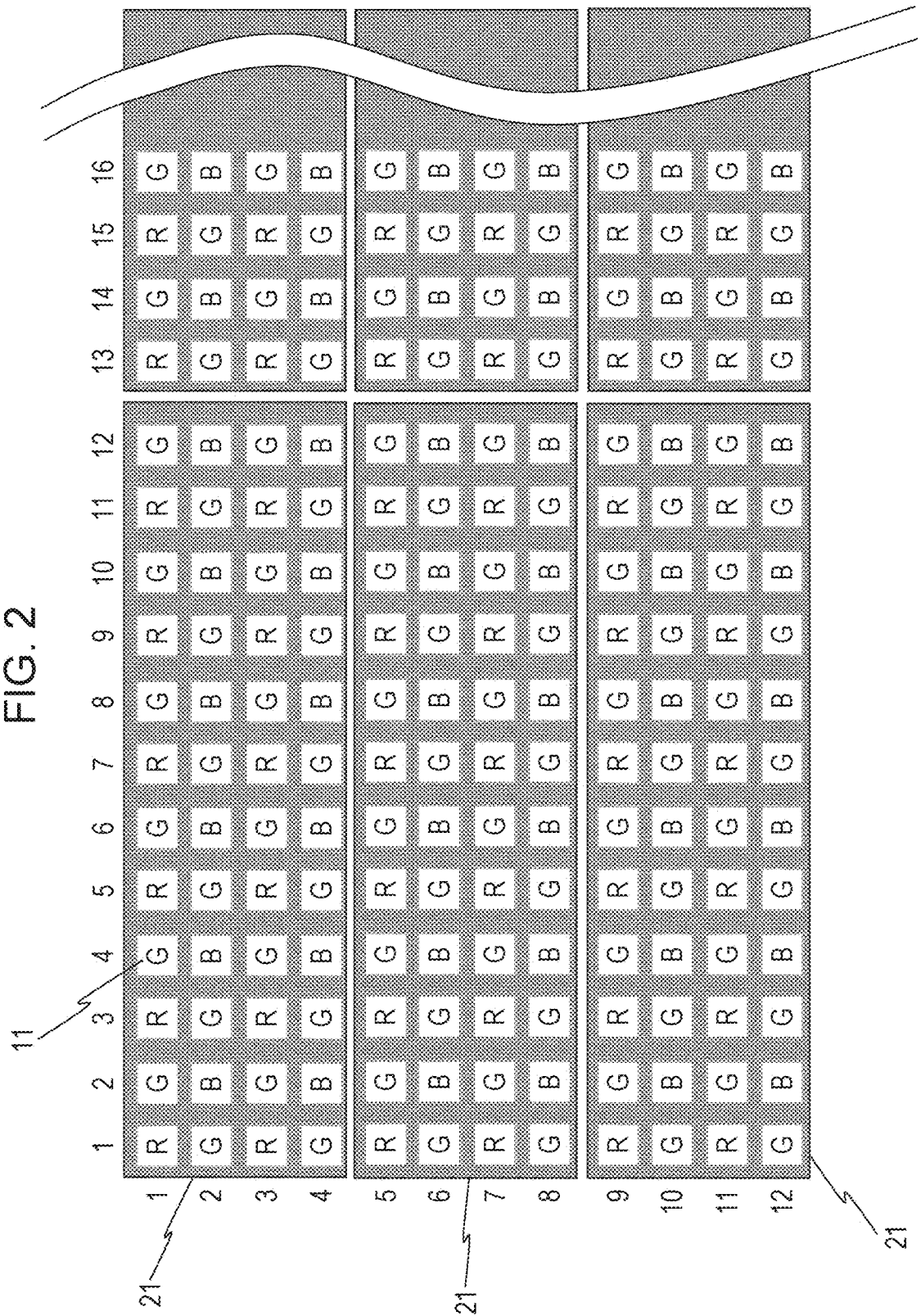
FIG. 2 is a diagram illustrating a layout of pixels and signal processing circuits of an image capturing apparatus as seen in plan view.

FIG. 2 is a diagram illustrating a layout, as seen in plan view, of pixels 11 included in the first chip 1 and the signal processing circuits 21 included in the second chip 5. In FIG. 2, colors of color filters disposed on pixels 11 are also shown. In FIG. 2, R denotes that a corresponding pixel 11 has a color filter of red (R). Similarly, G denotes that a corresponding pixel 11 has a color filter of green (G), and B denotes that a corresponding pixel 11 has a color filter of blue (B). In other words, there are pixels on which light with a wavelength corresponding to a first color is incident, and pixels on which light with a wavelength corresponding to a second color is incident. Typically, the wavelength corresponding to red color is 600 to 830 nm, and the wavelength corresponding to green color is 500 to 600 nm. The wavelength corresponding to blue color is 360 to 500 nm.

One signal processing circuit 21 is disposed so as to overlap with pixels 11 arranged along a plurality of rows and a plurality of columns. In this example, the one signal processing circuit 21 is disposed such that it overlaps with pixels 11 in four rows and 12 columns. The signal processing circuit 21 includes, as will be described later, a multiplex circuit, an amplifier circuit, and an analog-to-digital conversion circuit (hereinafter referred to as the AD conversion circuit) forming an analog-to-digital conversion unit. That is, in this layout, part or all of the multiplex circuit, the amplifier circuit, and the AD conversion circuit of the one signal processing circuit 21 overlap with pixels 11.

As will be described in further detail later, the AD conversion circuit in the one signal processing circuit 21 performs an AD conversion on signals output from pixels 11 each having a color filter of the first color, but does not perform an AD conversion on signals output from pixels 11 each having a color filter of the second color. Therefore, the one signal processing circuit 21 overlaps, in plan view, with both pixels 11 subjected to the AD conversion and pixels 11 not subjected to the AD conversion.

Note that the layout described above is merely an example. In the present embodiment, other layouts may be employed in which a plurality of pixels 11 are disposed for one signal processing circuit 21.

Equivalent Circuit of Image Capturing Apparatus

Figure 3A:
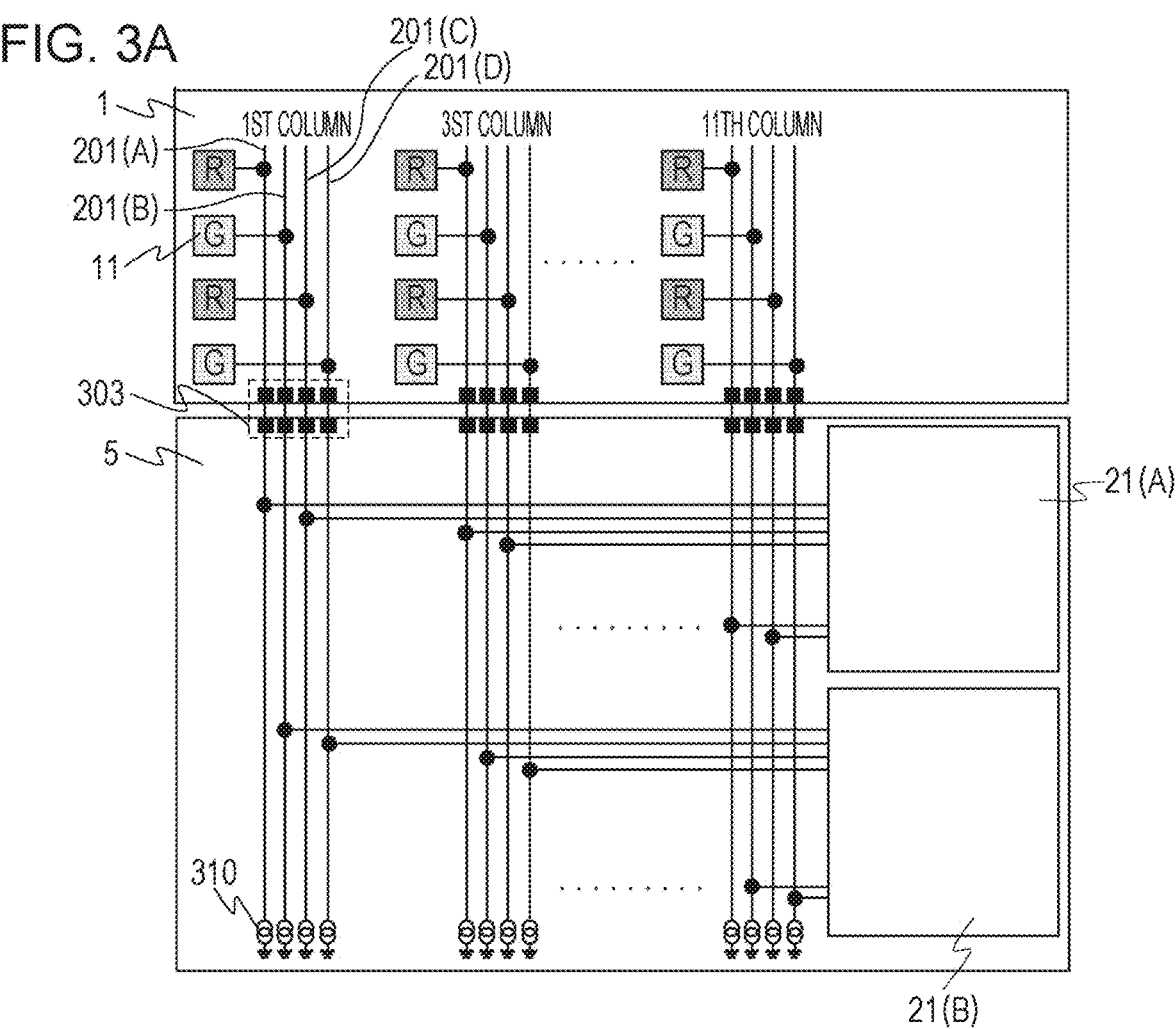
FIG. 3A is a diagram illustrating pixels.

In FIG. 3A, of the pixels 11 shown in FIG. 1, only those located in odd-numbered columns are shown. Signal lines and pixels 11 are disposed on the first chip 1 such that four signal lines 201(A) to 201(D) are disposed for pixels 11 arranged in one column. In the following description, when the signal lines 201(A) to 201(D) are not distinguished from each other, a simple expression such as a signal line 201 or signal lines 201 will be used. A pixel 11 in a first row is connected to the signal line 201(A). Similarly, pixels 11 in the second to fourth rows are respectively connected to the signal lines 201(B) to 201(D). In other columns, signal lines 201(A) to 201(D) are disposed such that pixels 11 are connected in a similar manner as in the first column.

The signal lines 201(A) and 201(C) are each connected to a signal processing circuit 21(A) via a connection unit 303. The signal lines 201(B) and 201(D) are each connected to a signal processing circuit 21(B) via the connection unit 303. The signal processing circuit 21(A) and the signal processing circuit 21(B) are similar in circuit configuration. Thus, hereinafter, when a description is common for both signal processing circuits, alphabetic suffixes are omitted. Next, a configuration of the signal processing circuit 21 is described.

Figure 3B:
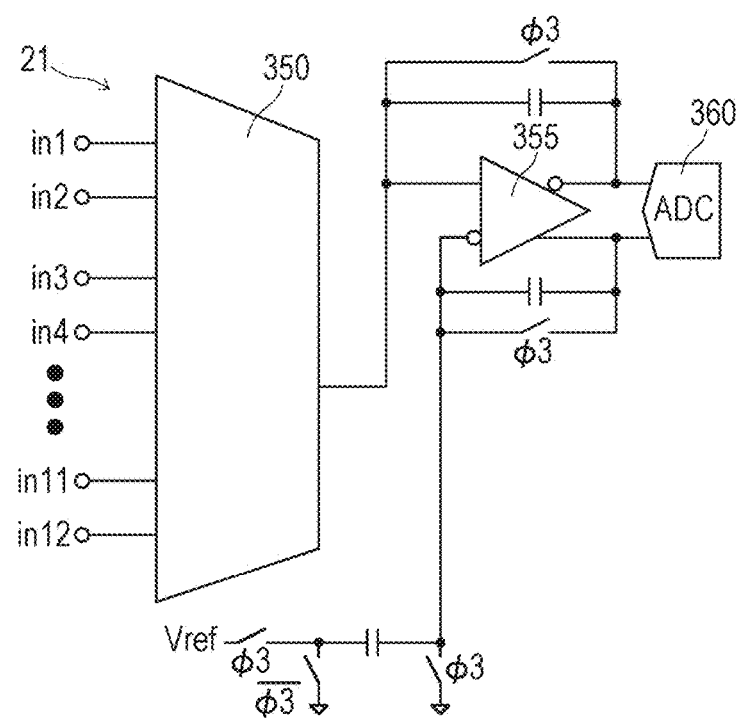
FIG. 3B is a diagram illustrating an equivalent circuit of a signal processing circuit.

FIG. 3B illustrates an equivalent circuit of the signal processing circuit 21. A plurality of signal lines 201 are each connected, via the connection unit 303, to a multiplex circuit (hereinafter referred to as an MPX circuit) 350 included in the signal processing circuit 21. The signal processing circuit 21 includes an amplifier circuit 355 and an AD conversion circuit (hereinafter, in the specification and the drawings, referred to as an ADC) 360. An output of the MPX circuit 350 is connected to the ADC 360 via the amplifier circuit 355. Thus, the MPX circuit 350 functions as a selection unit that selects one of the plurality of signal lines 201 and connects the selected one to the ADC 360(A). In FIG. 3B, one of the plurality of signal lines 201 is selected and connected to one amplifier circuit 355. However, actually, a plurality of amplifier circuits 355 are disposed for one MPX circuit 350. That is, actually, the MPX circuit 350 has a plurality of input nodes and a plurality of output nodes, and is configured such that a signal input to one of the plurality of input nodes from a pixel is output to one of the plurality of output nodes.

The amplifier circuit 355 is, for example, an operational amplifier. The amplifier circuit 355 has an inverting input terminal and a non-inverting input terminal. One of the two input terminals is connected to the MPX circuit 350, and the other one of the two input terminals is supplied with a reference voltage Vref. In the example shown in FIG. 3B, the reference voltage Vref is supplied via a capacitor. The capacitor is connected to a reset switch. Two output terminals of the amplifier circuit 355 are each connected to the ADC 360. Furthermore, the two output terminals of the amplifier circuit 355 are respectively connected to an inverting input terminal and a non-inverting input terminal via feedback capacitors. In each feedback path, an initialization switch is connected in parallel to the feedback capacitor. The amplifier circuit 355 has a gain greater than 1. For example, the amplifier circuit 355 is capable of selecting a gain between 1 and 4.

As shown in FIG. 3A, each of all pixels 11 connected to the ADC 360(A) has an R color filter. On the other hand, any pixel 11 connected to the ADC 360(B) has a G color filter. As described above, any one of the plurality of first pixels 11 each having a color filter of a first color (R) is connected to the ADC 360(A) functioning as a first AD conversion unit without being connected to the ADC 360(B) functioning as a second AD conversion unit. As for the plurality of first pixels 11 each having a color filter of a second color (G), each first pixel 11 is connected to the ADC 360(B) functioning as the second AD conversion unit without being connected to the ADC 360(A) functioning as the first AD conversion unit.

Furthermore, as shown in FIG. 3A, the second chip 5 includes current sources 310. Each current source 310 supplies a current to a signal line 201 in each column via the connection unit 303.

Figure 4:
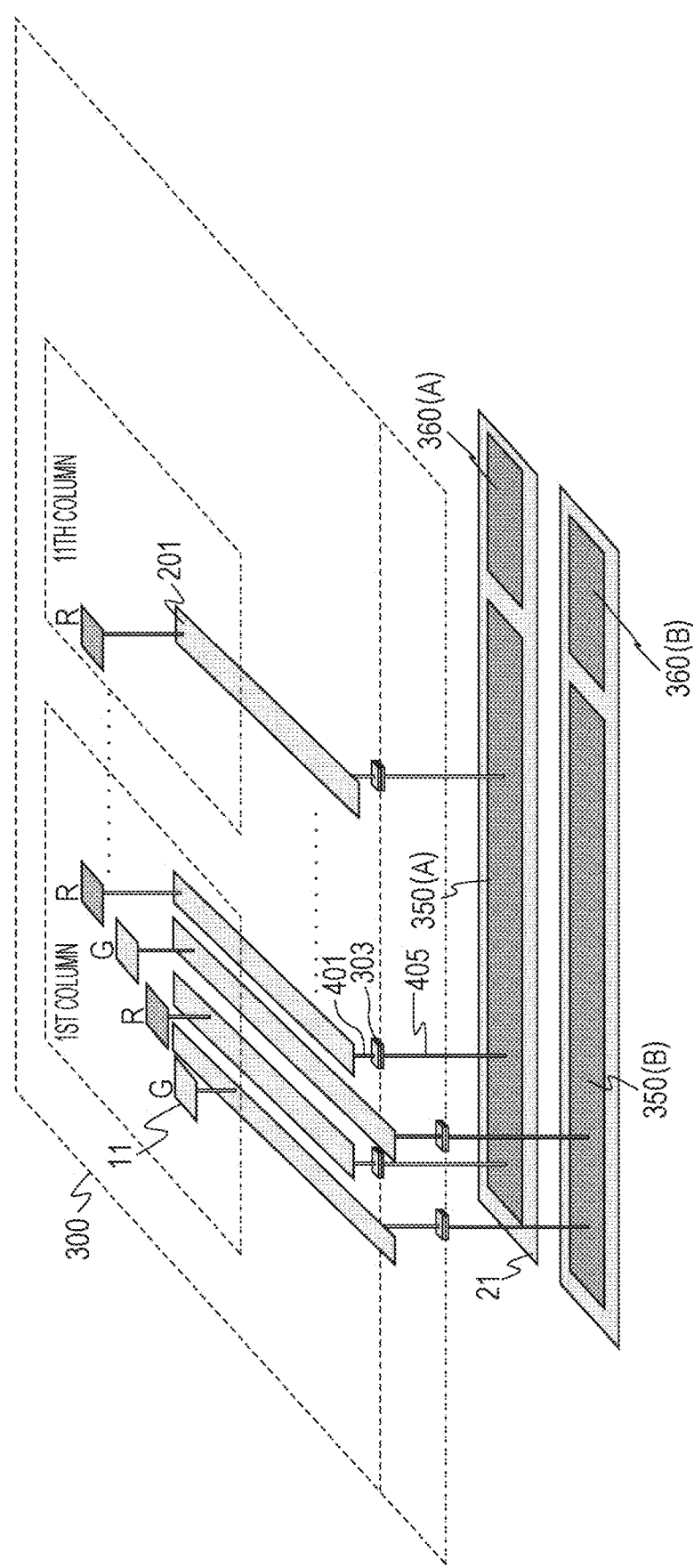
FIG. 4 is a diagram illustrating connections between pixels and signal processing circuits.

Cross-Sectional Structure of Connection Unit and Surrounding Elements in Image Capturing Apparatus FIG. 4 is a diagram illustrating a cross-sectional structure of the image capturing apparatus shown in FIG. 3. FIG. 4 mainly illustrate pixels 11 disposed in four rows and in one column and a pixel disposed in the 1st row and in the 11th column. The first chip 1 and the second chip 5 shown in FIG. 1 are connected to each other via a connection plane 300.

Figure 5:
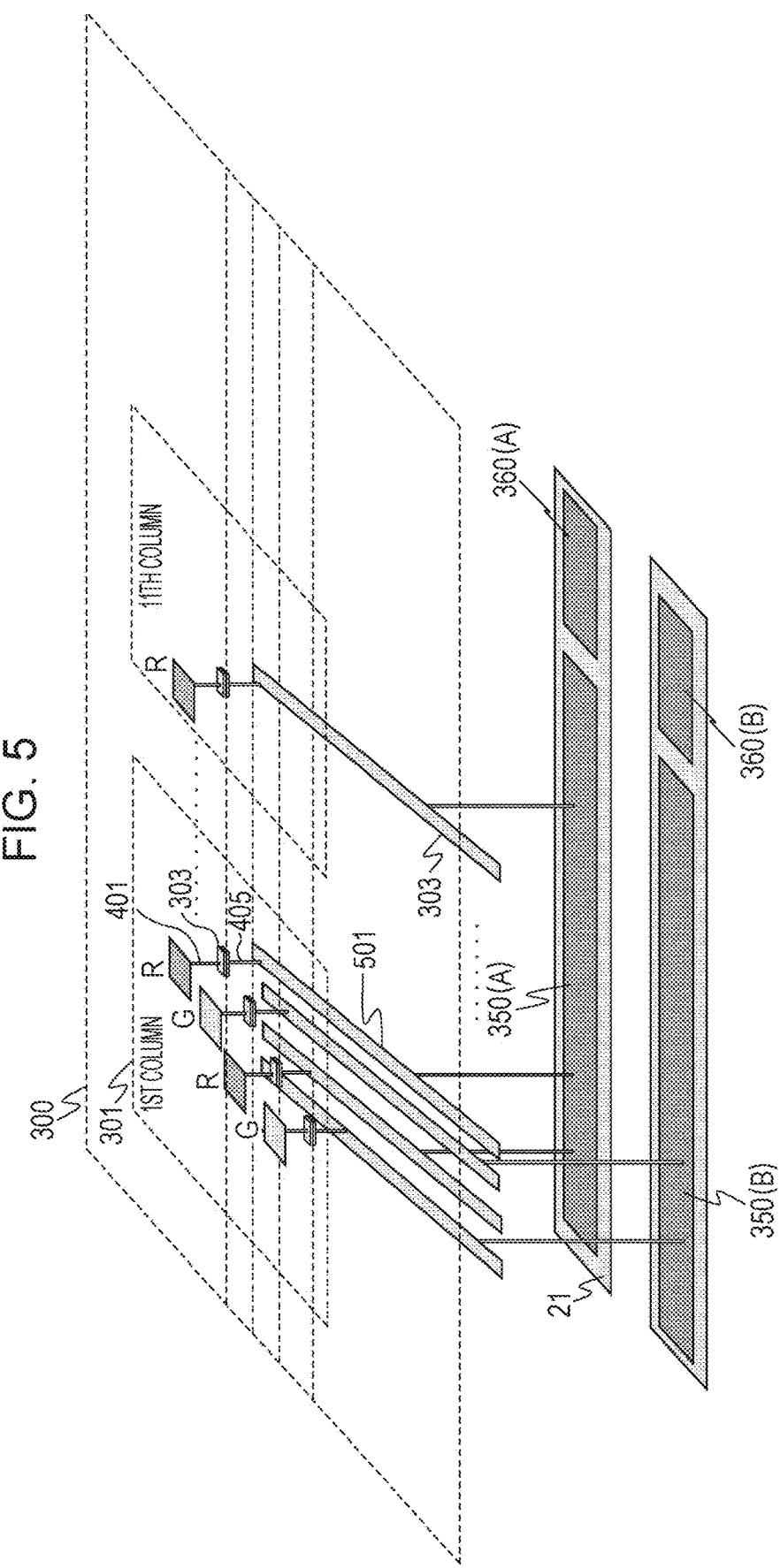
FIG. 5 is a diagram illustrating connections between pixels and signal processing circuits.

The image capturing apparatus according to the present embodiment is of a back-illuminated type. Each pixel 11 includes a non-illustrated photoelectric conversion element. A signal line 201 is disposed between the photoelectric conversion element and the connection plane 300. The signal line 201 extends in a predetermined direction (along columns in the example shown in FIG. 4) with respect to the pixels 11. The signal line 201 is connected to the connection unit 303 via a connection line 401. The MPX circuit 350(A) is connected to the connection unit 303 via a connection line 405. The connection line 401, the connection line 405, and the connection unit 303 are disposed such that they overlap with each other when seen in plan view. In other words, the signal processing circuit 21 and the signal line 201 are connected to each other via the connection line 405 and the connection line 401 formed so as to overlap with the connection line 405 as seen in plan view. By connecting the connection line 401 to the signal line 201 extending in the predetermined direction, the signal line 201 and the MPX circuit 350 are connected to each other. The extending of the signal line 201 in the predetermined direction makes it easy to connect the connection line 401 and the signal line 201 to each other. In an alternative example, as shown in FIG. 5, signal lines 501 extending in the predetermined direction may be disposed not on the first chip 1 but on the second chip 5. Also in this configuration, it is possible to connect pixels 11 to the MPX circuit 350(A). However, it is more preferable to dispose the signal lines extending in the predetermined direction on the first chip 1 as shown in FIG. 4 than disposing the signal lines on the second chip 5 as shown in FIG. 5. This is because the second chip 5 including the signal processing circuits 21 has a greater number of interconnection layers than the number of interconnection layers included in the first chip 1 including the pixels 11. Disposing the signal lines 201 on the first chip 1 having a small number of interconnection layers as shown in FIG. 4 can provide a higher design flexibility than can be achieved by disposing the signal lines 501 on the second chip 5 having a large number of interconnection layers as shown in FIG. 5.

Equivalent Circuit of Pixel

Figure 6:
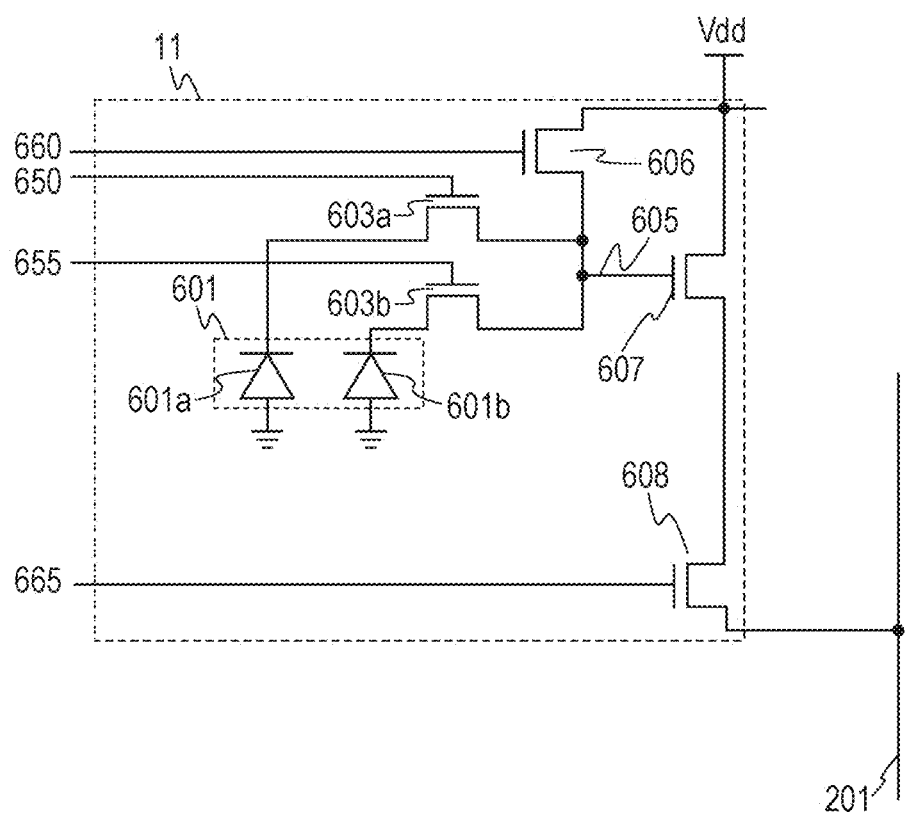
FIG. 6 is a diagram illustrating an equivalent circuit of a pixel.

FIG. 6 is an equivalent circuit diagram of a pixel 11 according to the present embodiment. The pixel 11 includes photodiodes 601a and 601b each functioning as a photoelectric conversion element. Light is incident on each of the photodiodes 601a and 601b via non-illustrated one microlens and one of color filters arranged in the form of an array as shown in FIG. 2. That is, light incident on the photodiode 601a is substantially identical in wavelength to light incident on the photodiode 601b.

The photodiode 601a is connected to a floating diffusion part (hereinafter referred to as the FD part) 605 via a transfer transistor 603a. A gate of the transfer transistor 603a is connected to a non-illustrated vertical scanning circuit via a control line 650. The photodiode 601b is connected to an FD part 605 via a transfer transistor 603b. A gate of the transfer transistor 603b is connected to the non-illustrated vertical scanning circuit via a control line 655.

The FD part 605 is connected to a reset transistor 606 and a gate of an amplifier transistor 607.

The reset transistor 606 and the amplifier transistor 607 are supplied with a power supply voltage Vdd. A gate of the reset transistor 606 is connected to the non-illustrated vertical scanning circuit via a control line 660.

The amplifier transistor 607 is connected to a selection transistor 608. A gate of the selection transistor 608 is connected to the non-illustrated vertical scanning circuit via a control line 665.

The selection transistor 608 is connected to a signal line 201.

Operation of Image Capturing Apparatus

FIGS. 7A and 7B are diagrams illustrating an operation of an image capturing apparatus including pixels 11 one of which is shown in FIG. 6.

A signal PRES shown in FIGS. 7A and 7B denotes a signal supplied from the vertical scanning circuit to the gate of the reset transistor 606 via the control line 660 shown in FIG. 6. Similarly, a signal PSEL denotes a signal supplied from the vertical scanning circuit to the gate of the selection transistor 608 of the pixel 11 in an N-th row via the control line 665. As for the signal PSEL, a numeral described between parentheses following PSEL indicates the row location of the pixel 11 to which the signal PSEL is supplied. That is, for example, the signal PSEL(1) denotes a signal PSEL supplied to the pixel 11 in the 1st row. A signal PTXA denotes a signal supplied from the vertical scanning circuit to the gate of the transfer transistor 603a via the control line 650. A signal PTXB denotes a signal supplied from the vertical scanning circuit to the gate of the transfer transistor 603b via the control line 655.

In FIGS. 7A and 7B, operations associated with the MPX circuit 350(A) and the ADC 360(A) are shown. As shown in FIG. 3, the MPX circuit 350(A) and the ADC 360(A) are input with signals output from pixels 11 each having the R color filter and located in the 1st row and the 3rd row and in odd-numbered columns of the 1st to 12th columns Thus, FIGS. 7A and 7B show operations associated with pixels 11 located in the 1st row and the 3rd row and in odd-numbered columns of the 1st to 12th columns.

A signal MPX shown in FIGS. 7A and 7B denotes a signal output from a non-illustrated timing generator to the MPX circuit 350(A). In response to a change in the signal value of the signal MPX, the MPX circuit 350(A) switch the signal to be output to the amplifier circuit 355(A) and the ADC 360(A) sequentially one to another among the signal lines 201 corresponding to pixels 11 in the odd-numbered columns of the 1st to 12th columns. Hereinafter, the operation in which the MPX circuit 350 outputs a signal to the amplifier circuit 355, and the amplifier circuit 355 in turn amplifies the signal and outputs the resultant signal to the ADC 360 will also be referred simply as outputting of the signal from the MPX circuit 350 to the ADC 360.

In FIGS. 7A and 7B, Col_nm denotes a specific column which is selected as a column for which a signal is output by the MPX circuit 350(A) to the ADC 360(A). More specifically, n of Col_nm denotes a column number of pixels 11 and m of Col_nm denotes an alphabet (A to D) described at a suffix of the signal lines 201 (A) to (D) corresponding to one column of pixels 11. For example, Col_1A indicates a signal line 201(A) corresponding to a pixel 11 in the 1st column.

At time t1, the signal PRES at a high level is output from the vertical scanning circuit to pixels 11 in the 1st row and the 3rd row. As a result, the reset transistor 606 of the pixel 11 in the 1st row is in an ON-state. Thus, the FD part 605 is reset to an electric potential corresponding to the power supply voltage Vdd. Furthermore, at time t1, the signal PSEL(1) output from the vertical scanning circuit is at the high level. As a result, the selection transistor 608 of the pixel 11 in the 1st row turns on. As a result, a current output from the current source 310 shown in FIG. 3A is supplied to the amplifier transistor 607 via the selection transistor 608 of the pixel 11 in the 1st row. As a result, a source follower circuit is formed by the power supply voltage Vdd, the amplifier transistor 607, and the current source 310. That is, a source follower operation is performed such that the amplifier transistor 607 outputs a signal corresponding to the electric potential of the FD part 605 to the signal line 201 via the selection transistor 608.

Operation: Reading of N Signal Corresponding to Pixel 11 in 1st Row

At time t2, the vertical scanning circuit changes the signal PRES output to the pixel 11 in the 1st row to a low level. As a result, the reset transistor 606 of the pixel 11 in the 1st row turns off. Thus, the reset state of the FD part 605 is released. The amplifier transistor 607 outputs a signal based on the electric potential of the FD part 605, whose reset state has been released, to the signal line 201(A) shown in FIG. 3. This signal denoted as an N signal (a noise signal). As a result, N signals are output from pixels 11 to the signal lines 201(A) in the respective columns.

Operation: AD Conversion on N Signal Corresponding to Pixel 11 in 1st Row

In a period following time t2, in response to the signal MPX supplied from the timing generator, the MPX circuit 350(A) sequentially connects the signal lines 201(A), corresponding to the pixels 11 in odd-numbered columns of the 1st to 12th columns, to the ADC 360(A).

The ADC 360(A) performs AD conversion on the noise signal output from the MPX circuit 350(A) via the signal line 201(A) in the 1st column. Thereafter, the ADC 360(A) performs AD conversion sequentially on the noise signals output to the signal lines 201(A) corresponding to the pixels 11 in the odd-numbered columns of the 1st to 12th columns.

Operation: Reading of N Signal Corresponding to Pixel 11 in 3rd Row

At time t16, the vertical scanning circuit changes the level of the signal output to the pixel 11 in the 3rd row to the low level. As a result, the reset transistor 606 of the pixel 11 in the 3rd row turns off. Thus, the reset state of the FD part 605 is released. The amplifier transistor 607 outputs an N signal, that is, a signal based on the electric potential of the FD part 605 whose reset state has been released to the signal line 201(C) shown in FIG. 3. Thus, noise signals are output from pixels 11 to signal lines 201(C) in the respective columns.

Operation: AD Conversion on N Signal Corresponding to pixel 11 in 3rd Row

In a period following time t16, in response to the signal MPX supplied from the timing generator, the MPX circuit 350(A) sequentially connects the signal lines 201(C) corresponding to the pixels 11 in odd-numbered columns of the 1st to 12th columns to the ADC 360(A).

The ADC 360(A) performs AD conversion on the N signal output from the MPX circuit 350(A) via the signal line 201(C) in the 1st column thereby generation a digital signal corresponding to the N signals. Thereafter, the ADC 360(A) performs AD conversion sequentially on the noise signals output to the signal lines 201(C) corresponding to the pixels 11 in the odd-numbered columns of the 1st to 12th columns thereby generating digital signals of the N signals.

Operation: Reading of A+B Signal Corresponding to Pixel 11 in 1st Row

At time t16, the vertical scanning circuit changes the levels of the signals PTXA and PTXB to be output to the pixel 11 in the 1st row to the high level. As a result, charges (electrons in the present embodiment) accumulated in the photodiodes 601a and 601b are transferred to the FD part 605 via the transfer transistors 603a and 603b. In the FD part 605, charges transferred from the photodiodes 601a and 601b are added together. As a result, the electric potential of the FD part 605 becomes equal to an electric potential corresponding to the sum of the charges transferred from the photodiodes 601a and 601b. Let an A signal denote a signal that would be output from the amplifier transistor 607 based on the electric potential of the FD part 605 if the electric potential of the FD part 605 is given only by the charge from the photodiode 601a. Furthermore, let a B signal denote a signal that would be output from the amplifier transistor 607 based on the electric potential of the FD part 605 if the electric potential of the FD part 605 is given only by the charge from the photodiode 601b. Using these notations, the signal output from the amplifier transistor 607 based on the electric potential of the FD part 605 corresponding to the sum of the charges transferred from the photodiodes 601a and 601b is equal to the sum of the A signal and the B signal, which can be denoted as an A+B signal. To the signal line 201(A) in each column, the A+B signal from the pixel 11 in the 1st row is output. AD conversion on A+B signal corresponding to pixel 11 in 1st row In a period following time t30, in response to the signal MPX supplied from the timing generator, the MPX circuit 350(A) sequentially connects the signal lines 201(A) corresponding to the pixels 11 in odd-numbered columns of the 1st to 12th columns to the ADC 360(A).

The ADC 360(A) perform AD conversion on the A+B signal output from the MPX circuit 350(A) via the signal line 201(A) in the 1st column thereby generating a digital signal corresponding to the A+B signal. Thereafter, the ADC 360(A) sequentially performs AD conversion on the A+B signals output to the signal lines 201(A) corresponding to the pixels 11 in the odd-numbered columns of the 1st to 12th columns thereby generating digital signals corresponding to the A+B signals.

Operation: Reading of A+B Signal Corresponding to Pixel 11 in 3rd Row

At time t30, the vertical scanning circuit changes the levels of the signals PTXA and PTXB to be output to the pixel 11 in the 3rd row to the high level. As a result, the A+B signal from the pixel 11 in the 3rd row is output to the signal line 201(C) in each column.

Operation: AD Conversion on A+B Signal Corresponding to Pixel 11 in 3rd Row

In a period following time t44, in response to the signal MPX supplied from the timing generator, the MPX circuit 350(A) sequentially connects the signal lines 201(C), corresponding to the pixels 11 in odd-numbered columns of the 1st to 12th columns, to the ADC 360(A).

The ADC 360(A) performs AD conversion on the A+B signal output from the MPX circuit 350(A) via the signal line 201(C) in the 1st column thereby generating a digital signal corresponding to the A+B signal. Thereafter, the ADC 360(A) sequentially performs AD conversion on the A+B signals output to the signal lines 201(C) corresponding to the pixels 11 in the odd-numbered columns of the 1st to 12th columns thereby generating digital signals corresponding to the A+B signals.

Parallel Operation Performed by Image Capturing Apparatus

In the operation shown in FIGS. 7A and 7B, a plurality of operations are performed in parallel as described below.

(1) Parallel operation of AD conversion of an N signal corresponding to a pixel 11 in the 1st row and reading of an N signal corresponding to a pixel 11 in the 3rd row.

(2) Parallel operation of AD conversion of an N signal corresponding to a pixel 11 in the 3rd row and reading of an A+B signal corresponding to a pixel 11 in the 1st row.

(3) Parallel operation of AD conversion of an A+B signal corresponding to a pixel 11 in the 1st row and reading of an A+B signal corresponding to a pixel 11 in the 3rd row.

Performing the parallel operations described above makes it possible to reduce a waiting time until the ADC 360(A) starts a next AD conversion after the ADC 360(A) ends a previous AD conversion. Thus it is possible to reduce the total time for performing the AD conversion on signals output from all pixels 11. This makes it possible to increase the frame rate of the image capturing apparatus.

Effects of the Present Embodiment

In the image capturing apparatus according to the present embodiment, the signal processing circuit 21 includes the amplifier circuit 355. Therefore, the signal is amplified before the noise occurring in the ADC 360 is superimposed on the signal. As a result, an improvement in SN ratio is achieved.

Other Embodiments

In the embodiment described above, the signal lines 201, which are connected to pixels 11 each having a color filter of the first color, but which are not connected to pixels 11 having a color filter of the second color, are connected to the ADC 360. In this example, a connection unit is not provided for connections between the ADC 360 and pixels 11 each having a color filter of the second color.

Figure 8:
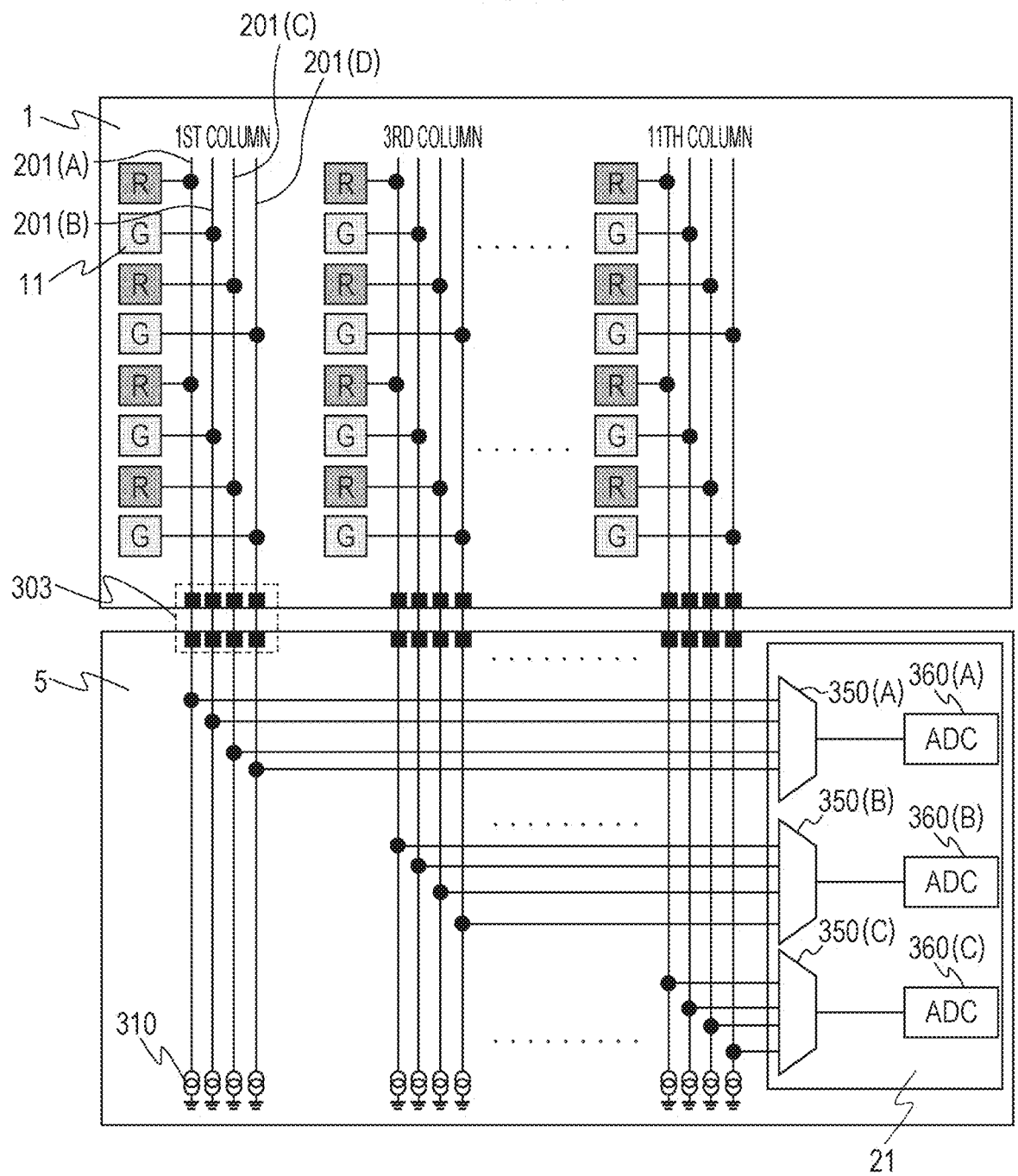
FIG. 8 is a diagram illustrating connections between pixels and signal processing circuits.

However, the present embodiment is not limited to this example. For example, as illustrated in FIG. 8, a plurality of signal lines are provided for pixels 11 located in one column and the plurality of signal lines are selectively connected via the MPX circuit 350 to the ADC 360. In this case, a plurality of pixels 11 having color filters of different colors are connected to one signal processing circuit 21. Also this configuration can provide an improved SN ratio as in the examples described above.

Second Embodiment

A second embodiment is described below focusing on differences from the first embodiment. An image capturing apparatus according to the second embodiment has a signal processing circuit 21 which is different in configuration from the signal processing circuit 21 according to the first embodiment. More specifically, the signal processing circuit 21 according to the present embodiment includes two multiplex circuits and a plurality of amplifier circuits disposed between the two multiplex circuits. The other elements in the configuration may be identical to those of the image capturing apparatus according to the first embodiment. The following description focuses on differences from the first embodiment.

Figure 9:
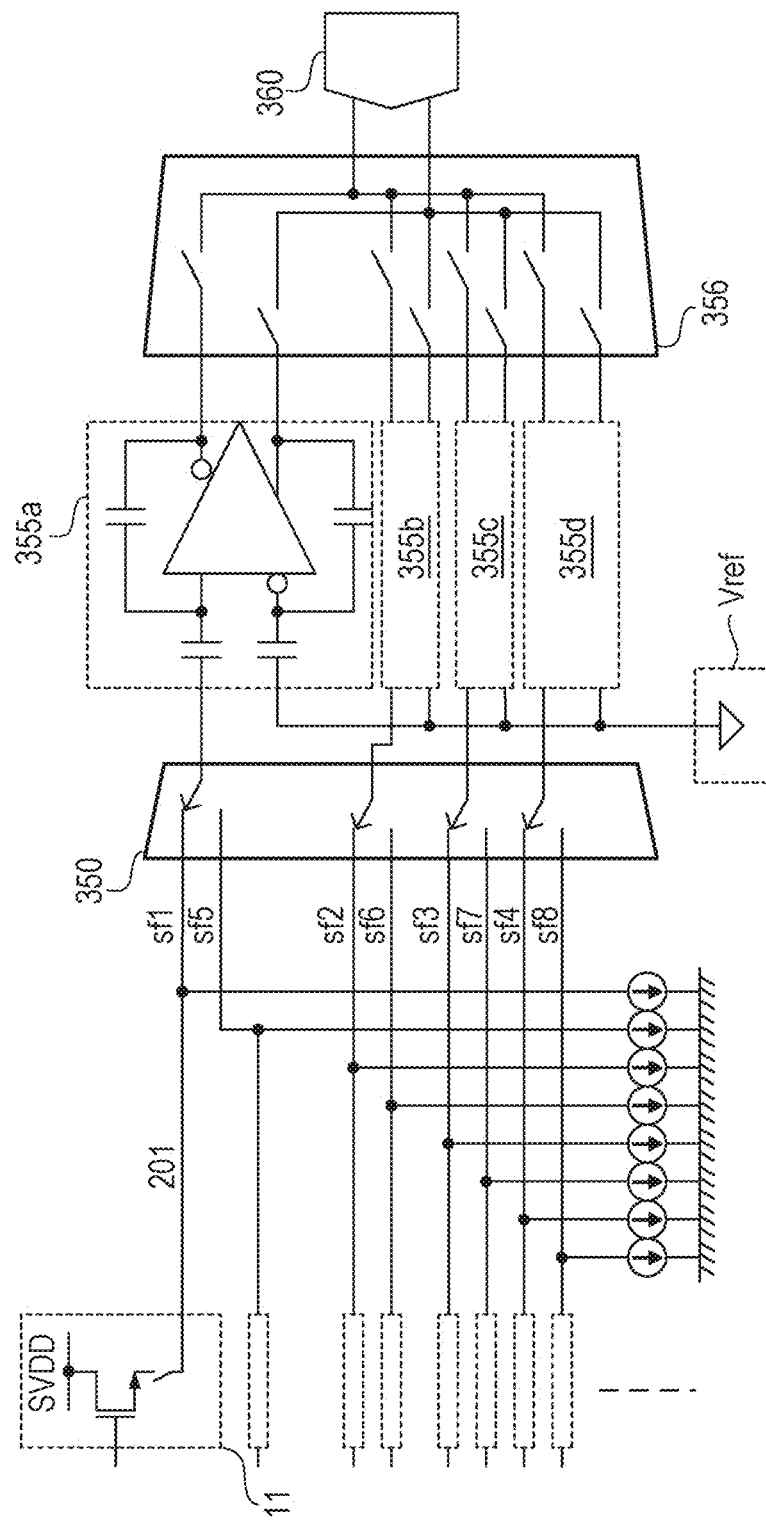
FIG. 9 is a diagram illustrating an equivalent circuit of a signal processing circuit.

FIG. 9 illustrates an equivalent circuit of the signal processing circuit 21 in the image capturing apparatus according to the present embodiment. The signal processing circuit 21 is similar to that according to the first embodiment in that the signal processing circuit 21 includes an MPX circuit 350 and an ADC 360. In FIG. 9, inputs of the MPX circuit 350 are respectively assigned symbols sf1 to sf8. Although in the example shown in FIG. 9, the MPX circuit 350 has 8 inputs, there is no particular restriction on the number of inputs.

The MPX circuit 350 has four output nodes. Each output node of the MPX circuit 350 is connected to an amplifier circuit 355. The signal processing circuit 21 includes four amplifier circuits 355a to 355d. The MPX circuit 350 selects either the input sf1 or the input sf5 and outputs the selected input signal to the amplifier circuit 355a. The MPX circuit 350 selects either the input sf2 or the input sf5, and outputs the selected input signal to the amplifier circuit 355b. The other inputs are also processed in a similar manner A signal output from the MPX 350 is input, via a capacitor, to one of the inverting input terminal and the non-inverting terminal of each amplifier circuit 355. The other one of the inverting input terminal and the non-inverting terminal of each amplifier circuit 355 is input with a reference signal Vref. The same reference signal Vref is supplied to the plurality of amplifier circuits 355.

Outputs of the plurality of amplifier circuits 355 are connected to the same multiplex circuit 356 (hereinafter referred to as the MPX circuit 356). The MPX circuit 356 selects one of outputs of the plurality of amplifier circuits 355, and outputs the selected signal to the ADC 360. The MPX circuit 356 selects one of signals output from the inverted output terminals of the respective plurality of amplifier circuits 355. The MPX circuit 356 also selects one of signals output from the non-inverted output terminals of the respective plurality of amplifier circuits 355.

As shown in FIG. 9, the number of inputs of the MPX circuit 356 is smaller than the number of inputs of the MPX circuit 350, and the number of amplifier circuits 355 is smaller than the number of inputs of the MPX circuit 350.

In the present embodiment, as described above, the plurality of amplifier circuits 355 are disposed in parallel between the two selection circuits (the MPX circuit 350 and the MPX circuit 356). This configuration makes it possible to increase the signal output rate.

Figure 10:
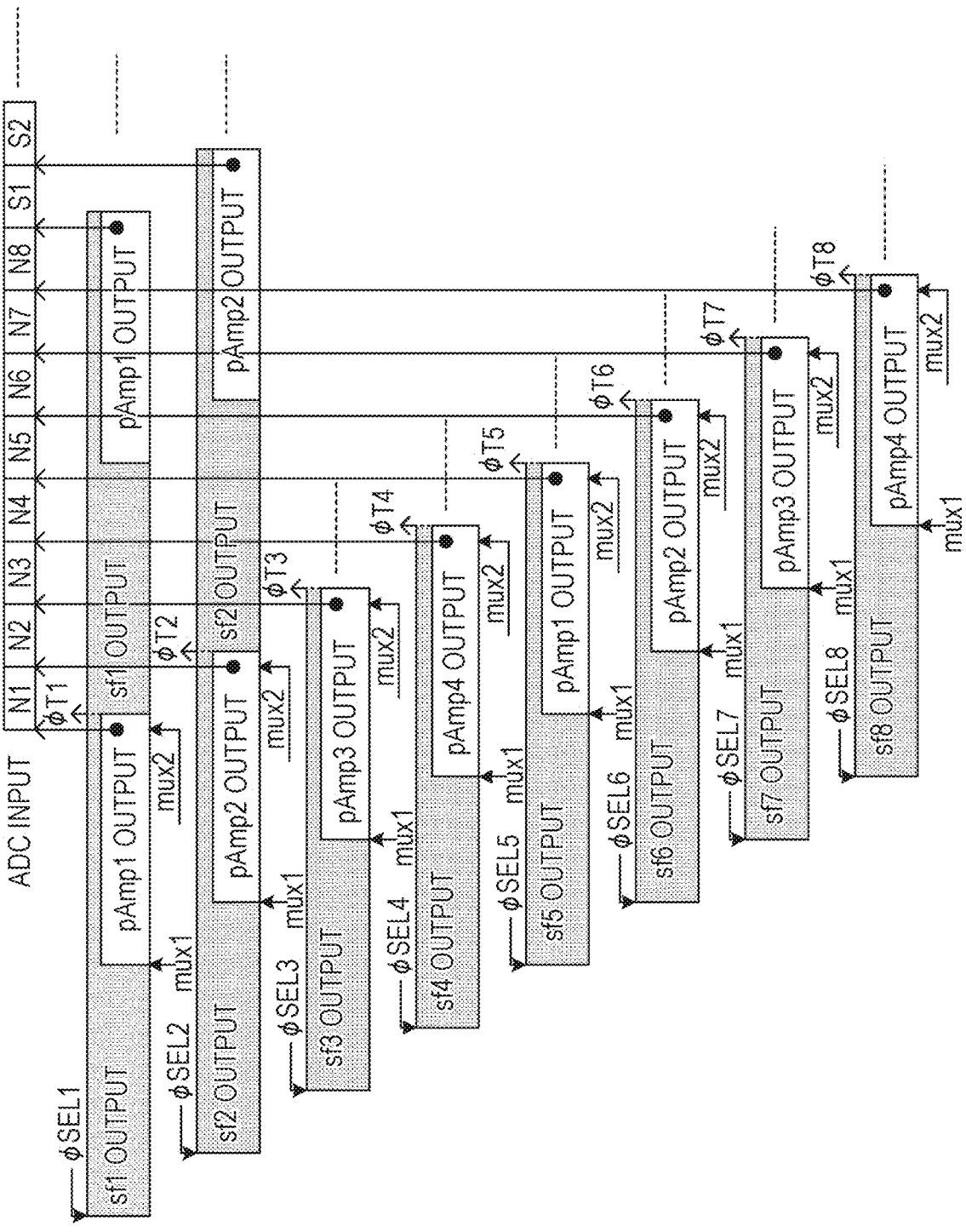
FIG. 10 is a diagram illustrating an operation of an image capturing apparatus.

Referring to FIG. 10, an operation of the signal processing circuit 21 according to the present embodiment is described. FIG. 10 schematically illustrates a processing operation for each of the signals of the output lines 201.

The process on the signal of the output line 201 connected to the input sf1 is explained. First, when a signal φSEL1 turns on, a pixel signal is output from a source follower circuit of a pixel 11 to an output line 201 connected to the input sf1. Thereafter, at timing mux1, the MPX circuit 355a selects the input sf1 and outputs the signal of the input sf1 to the amplifier circuit 355a located following the MPX circuit 350. When the output of the amplifier circuit 355a becomes stable at a point of time (mux2), the MPX circuit 356 supplies the output of the amplifier circuit 355a to the ADC 360 located following the MPX circuit 356. The ADC 360 performs the AD conversion on the pixel signal amplified by the amplifier circuit 355a. In the example shown in FIG. 10, the AD conversion is performed on N signals.

When a predetermined time elapses since the signal φSEL1 turns on, a signal φSEL5 turns on. As a result, a pixel signal is output from a source follower circuit of a pixel 11 to an output line 201 connected to the input sf5. Thereafter, at timing mux1, the MPX circuit 350 selects the input sf5 and outputs the signal of the input sf5 to the amplifier circuit 355a located following the MPX circuit 350. As described above, after a certain signal is input to one amplifier circuit 355, a next signal is input when an output signal corresponding to the previous signal input to the amplifier circuit 355 has become stable after a certain period of time elapsed.

In the present embodiment, a plurality of amplifier circuits 355 are connected in parallel at the stage following the MPX circuit 350. Therefore, in a period in which a previous output signal from one amplifier circuit 355 becomes stable, it is allowed to input a signal to another amplifier circuit 355. More specifically, in a period from turning on of the signal φSEL1 to tuning on of the signal φSEL5, signals φSEL2 to φSEL4 turn on. Thus, the MPX circuit 350 sequentially outputs the signals corresponding to inputs sf2 to sf4 to the amplifier circuits 355b to 355d, respectively. As a result, it is possible to increase the speed of the operation of outputting the plurality of signals.

As shown in FIG. 10, in the plurality of pixels 11 connected to one MPX circuit 350, signals φSEL1 to φSEL8 for controlling the selection transistors sequentially turn on. Compared with intervals at which the signals φSEL1 to φSEL8 turn on, the MPX circuit 350 sequentially changes outputs at intervals longer than intervals at which the signals φSEL1 to 8 sequentially turn on. For example, the interval from the timing mux1 of the input sf1 to the timing mux1 of the input sf5 is longer than the interval from the turning on of the signal φSEL1 to the turning on of the signal φSEL2. This ensures that a sufficiently long time is available for an output of each circuit in a transmission path of a pixel signal to become stable.

In another aspect, a selection circuit (an MPX circuit 356) is disposed at a stage following an amplifier circuit 355. This configuration makes it possible to reduce an influence of noise occurring in the selection circuit. As a result, an improvement in picture quality is achieved.

Figure 11:
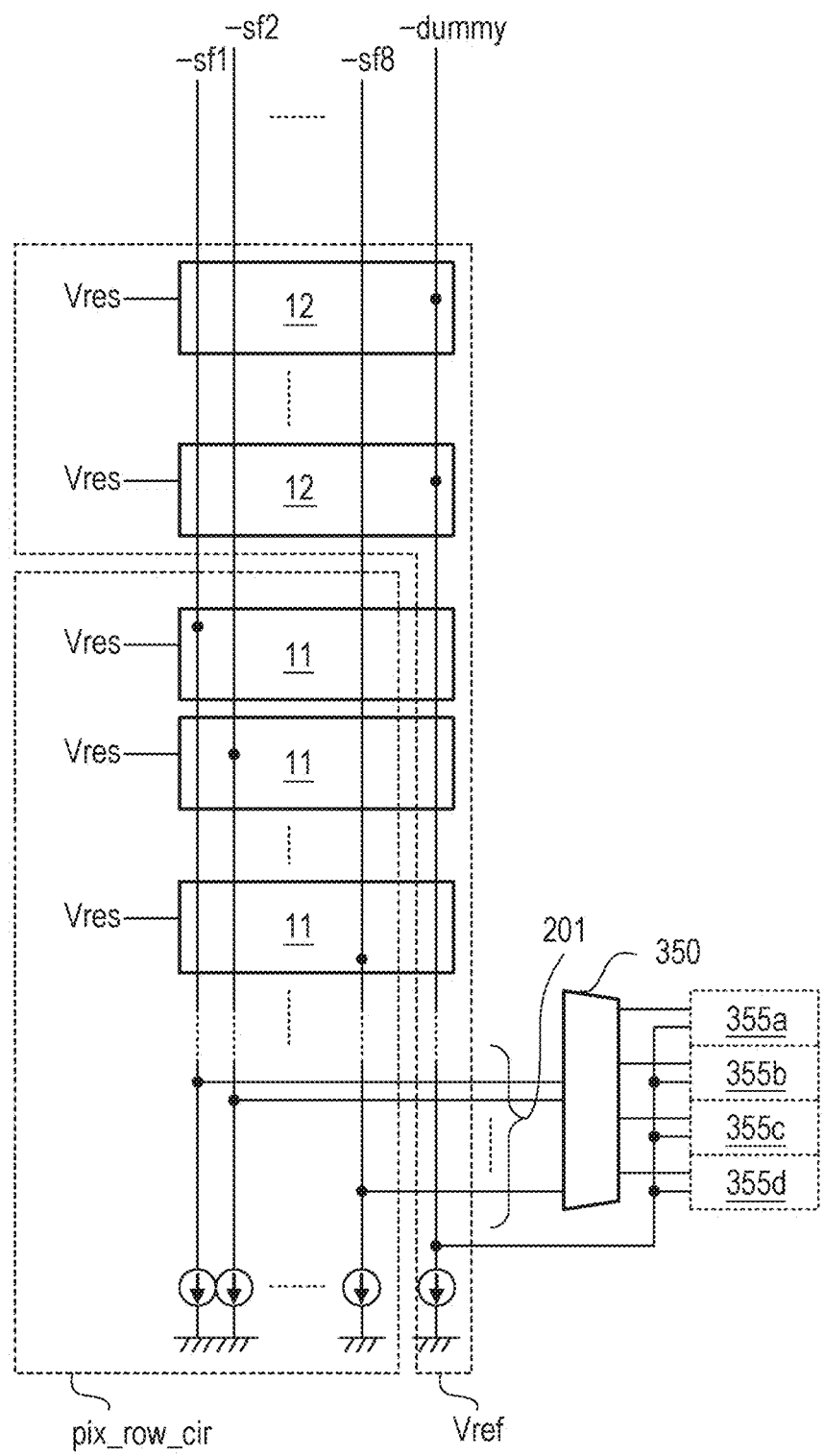
FIG. 11 is a diagram illustrating connections between pixels and signal processing circuits.

Subsequently, modifications of the present embodiment are described. FIG. 11 is a diagram illustrating connections between pixels and signal processing circuits in an image capturing apparatus. The image capturing apparatus shown in FIG. 11 includes dummy pixels 12 each of which outputs a reference signal Vref. Each dummy pixel is connected to an output line dummy. This output line dummy is connected to a current source. The dummy pixel 12 includes an amplifier transistor 607 as with the pixel 11. Thus, the amplifier transistor 607 and the current source connected to the output line dummy form a source follower circuit. In the dummy pixel 12, instead of the photoelectric conversion element, a voltage supply unit configured to supply a reference voltage is disposed. By employing this configuration, it becomes possible for the dummy pixel 12 to output the reference voltage Vref.

By outputting the reference voltage Vref by the dummy pixel 12, it is possible to cancel out crosstalk that occurs among a plurality of output lines 201. By disposing dummy pixels 12 in a plurality of columns such that outputs of the dummy pixels 12 in the plurality of columns are short-circuited, it is possible to average noise which is caused by transistors and superimposed on the reference signal Vref. As a result, an improvement in picture quality can be achieved.

Third Embodiment

A third embodiment is described below focusing on differences from the first embodiment. The image capturing apparatus according to the present embodiment is an example of an image capturing apparatus in which a successive approximation AD converter is used as the ADC 360 in the image capturing apparatus according to the first and second embodiments. The other elements in the configuration may be identical to those of the image capturing apparatus according to the first embodiment or the second embodiment.

Equivalent Circuit of Successive Approximation ADC

Figure 12:
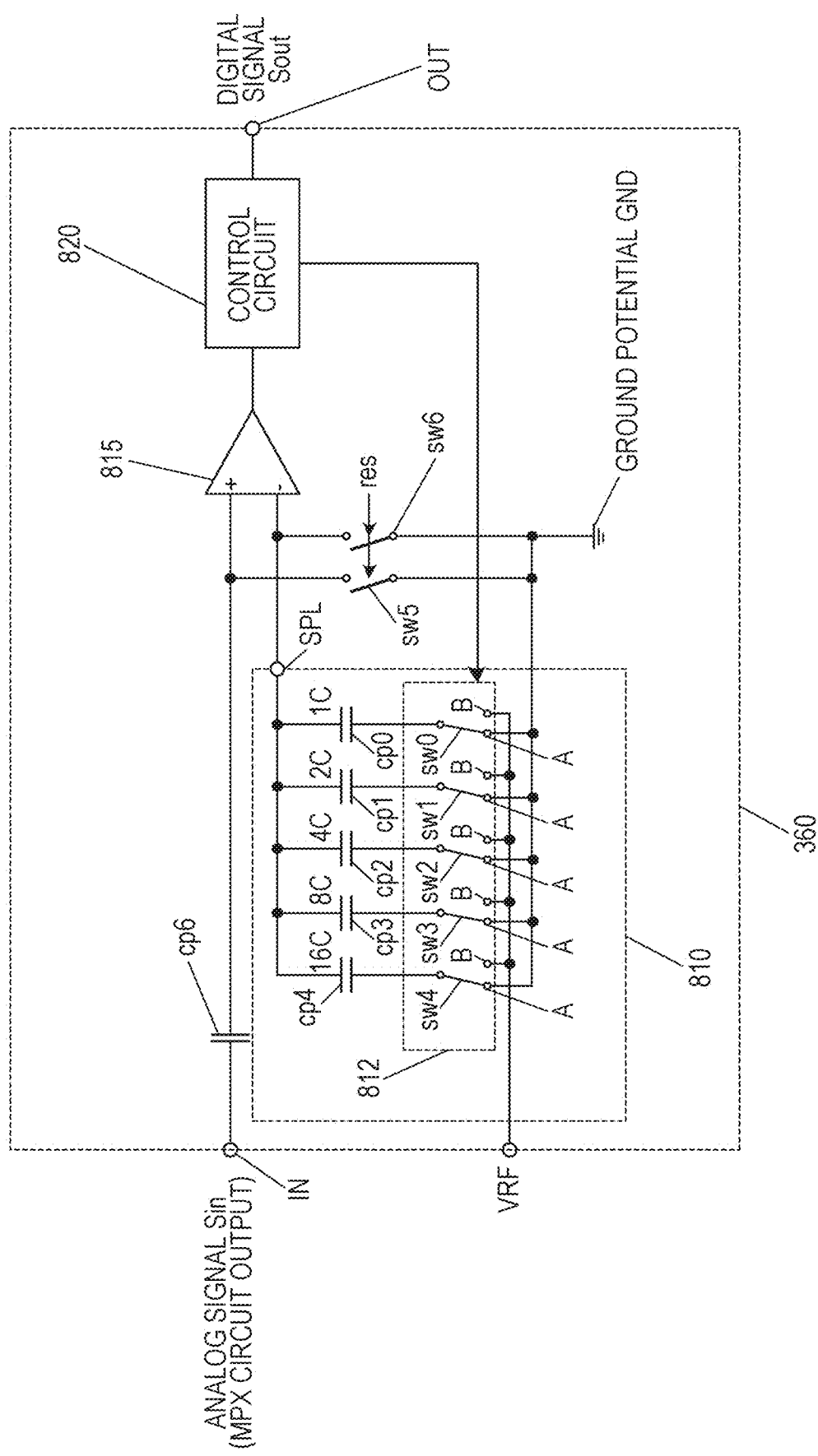
FIG. 12 is a diagram illustrating an equivalent circuit of an AD conversion circuit.

FIG. 12 is an equivalent circuit diagram of the ADC 360 according to the present embodiment.

The ADC 360 has an input terminal IN and an output terminal OUT. An analog signal Sin (output from the MPX circuit 350) input to the input terminal IN is converted to a digital signal Sout and output from the output terminal OUT. This analog signal Sin may be one or both of the N signal and the S signal described in the first embodiment. The ADC 360 converts the output from the MPX circuit output into the digital signal Sout with a resolution of 5 bits.

The ADC 360 further includes a generation circuit 810 configured to generate a comparison signal for use in comparison with the analog signal Sin. The generation circuit 810 includes a plurality of capacitive elements cp0 to cp4 having binary weighted capacitance values, and a plurality of switches sw0 to sw4 respectively connected to the capacitive elements cp0 to cp4. The plurality of switches sw0 to sw4 form a switch circuit for selecting one or more of the capacitive elements cp0 to cp4. The binary weights refer to a set of weights (capacitance values) given by a geometric progression with a geometric ratio of 2. In the example shown in FIG. 12, the capacitive elements cp0 to cp4 respectively have capacitance values of 1C, 2C, 4C, 8C, and 16C. One of electrodes of each of the capacitive elements cp0 to cp4 is connected to a supply terminal SPL of the generation circuit 810, and the other one is connected to corresponding one of the switches sw0 to sw4. One of terminals of each of the switches sw0 to sw4 is connected to corresponding one of the capacitive elements cp0 to cp4, and the other one toggles between terminals A and B. The terminal A is supplied with a ground potential GND, and the terminal B is supplied with a reference voltage VRF. The reference voltage VRF is a constant voltage supplied from the outside of the ADC 360 and having a value higher than the ground potential GND. When the switch sw0 toggles to the terminal A, the ground potential GND is supplied to the capacitive element cp0. When the switch sw0 toggles to the terminal B, the reference voltage VRF is supplied to the capacitive element cp0. The other switches sw1 to sw4 are also supplied with voltages in a similar manner. Changing over of the switches sw0 to sw4 results in a change in the combined capacitance value of capacitive elements connected between the supply terminal SPL and the reference voltage VRF, which in turn causes a change in the value of the comparison signal Vcmp output from the supply terminal SPL.

The ADC 360 further includes a comparator 815. The comparator 815 compares the value of the analog signal Sin with the value of the comparison signal Vcmp and outputs a signal corresponding to a comparison result. A non-inverting terminal of the comparator 815 is input with the analog signal Sin via a capacitive element cp6, while an inverting terminal of the comparator 815 is input with the comparison signal Vcmp from the supply terminal SPL of the generation circuit 810. Thus, when the value of the analog signal Sin is higher than or equal to the value of the comparison signal Vcmp, the comparator 815 outputs a high-level signal, while when the value of the analog signal Sin is lower than the value of the comparison signal Vcmp, the comparator 815 outputs a low-level signal. Although in the present example, the high-level signal is output when the value of the analog signal Sin is equal to the value of the comparison signal Vcmp, alternatively the low-level signal may be output. The capacitive element cp6 is adjusted within a range in which it is allowed to compare the value of the analog signal Sin with the value of the comparison signal Vcmp. In the present embodiment, for simplicity of explanation, it is assumed that the value of the analog signal Sin is in a range from ground potential GND to the reference voltage VRF, and a signal with the same value as the value of the analog signal Sin is supplied to the non-inverting terminal of the comparator 815.

In the example shown in FIG. 12, the analog signal Sin is supplied to the non-inverting terminal of the comparator 815, and the comparison signal Vcmp is supplied to the inverting terminal of the comparator 815. However, other configurations are allowed as long as it is possible to judge which is larger or smaller between the value of the analog signal Sin and the value of the comparison signal Vcmp. For example, a difference between the analog signal Sin and the comparison signal Vcmp may be supplied to the non-inverting terminal of the comparator 815, and the ground potential GND may be supplied to the inverting terminal of the comparator 815.

The ADC 360 further includes switches sw5 and sw6. When these switches sw5 and sw6 turn on, the ground potential GND is supplied to the non-inverting terminal and the inverting terminal of the comparator 815, and thus the comparator 815 is reset.

The ADC 360 further includes a control circuit 820. A comparison result is supplied from the comparator 815 to the control circuit 820, the control circuit 820 generates a digital signal Sout based on the received comparison result and outputs the resultant digital signal Sout from an output terminal OUT. The control circuit 820 transmits control signals to the respective switches sw0 to sw6 thereby switching the states thereof.

Operation of Successive Approximation ADC

Figure 13:
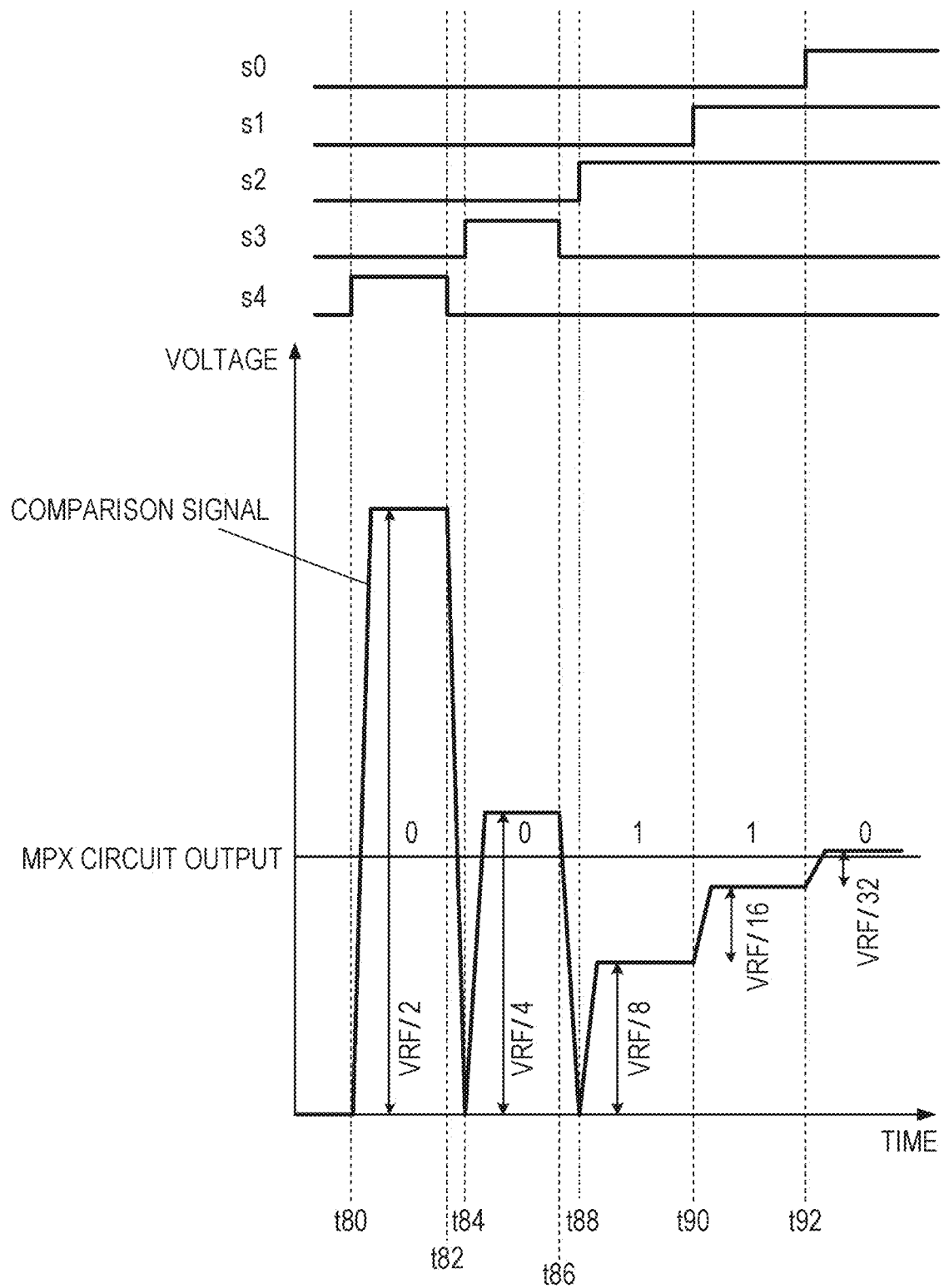
FIG. 13 is a diagram illustrating an operation of an AD conversion circuit.

In FIG. 13, sw0 to sw6 respectively indicate values of the control signals supplied from the control circuit 820 to the switches sw0 to sw6. Each of the switches sw0 to sw4 toggles to the terminal B when the supplied control signal is at the high level, while each of the switches sw0 to sw4 toggles to the terminal A when the control signals at the low level. Each of the switches sw5 and sw6 turns on when the supplied control signal is at the high level, while each of the switches sw5 and sw6 turns off when the control signal is at the low level. In a lower part of FIG. 13, the analog signal Sin and the comparison signal Vcmp are shown. In FIG. 13, by way of example, the analog signal Sin has a value corresponding to a binary number 00110.

Next, a time-series AD conversion operation of the AD converter 100 is described below. In a preparation period, the control circuit 820 supplies the control signal at the low level to the switches sw0 to sw4, and supplies the control signal at the high level to the switches sw5 and sw6. As a result, the non-inverting terminal and the inverting terminal of the comparator 815 are reset to the ground potential GND, and the value of the comparison signal Vcmp becomes equal to the ground potential GND. Thereafter, the control circuit 820 changes the level of the control signal supplied to the switches sw5 and sw6 to the low level. In the following operation, the analog signal Sin is continuously supplied to the non-inverting terminal of the comparator 815.

Next, when a successive approximation period starts, the control circuit 820 changes the level of the control signal supplied to the switch sw4 to the high level. As a result, the switch sw4 toggles to the terminal B, and thus the reference voltage VRF is applied to the supply terminal SPL of the generation circuit 810 via the capacitor cp4 having the largest capacitance value of the binary weights. As a result, the comparison signal Vcmp increases by VRF/2 and thus the value of the comparison signal Vcmp becomes equal to VRF/2. The control circuit 820 determines, based on the comparison result supplied from the comparator 815, that the value of the analog signal Sin is smaller than the value of the comparison signal Vcmp (VRF/2), and thus the control circuit 820 returns the level of the control signal supplied to the switch sw4 to the low level. As a result, the value of the comparison signal Vcmp returns to the ground potential GND. This comparison result means that the value of the MSB (the fifth bit as counted from the LSB regarded as the first bit) of the digital signal Sout is 0.

Next, the control circuit 820 changes the level of the control signal supplied to the switch sw3 to the high level. As a result, the reference voltage VRF is applied to the supply terminal SPL of the generation circuit 810 via the capacitor cp3 having a next largest capacitance of the binary weights. As a result, the comparison signal Vcmp increases by VRF/4, and thus the value of the comparison signal Vcmp becomes equal to VRF/4. The control circuit 820 determines, based on the comparison result given from the comparator 815, that the value of the analog signal Sin is smaller than the value (VRF/4) of the comparison signal Vcmp, and thus the control circuit 820 returns the level of the control signal supplied to the switch sw3 to the low level. As a result, the value of the comparison signal Vcmp returns to the ground potential GND. The comparison result means that the fourth bit of the value of the digital signal Sout is equal to 0.

Next, the control circuit 820 changes the level of the control signal supplied to the switch sw2 to the high level. As a result, the reference voltage VRF is applied to the supply terminal SPL of the generation circuit 810 via the capacitor cp2 having a third largest capacitance of the binary weights. As a result, the comparison signal Vcmp increases by VRF/8, and thus the value of the comparison signal Vcmp becomes equal to VRF/8. The control circuit 820 determines, based on the comparison result given from the comparator 815, that the value of the analog signal Sin is larger than the value (VRF/8) of the comparison signal Vcmp, and thus the control circuit 820 maintains the level of the control signal supplied to the switch sw2 at the high level. As a result, the value of the comparison signal Vcmp is maintained at VRF/8. The comparison result means that the third bit of the value of the digital signal Sout is equal to 1.

Next, the control circuit 820 changes the level of the control signal supplied to the switch sw1 to the high level. As a result, the reference voltage VRF is applied to the supply terminal SPL of the generation circuit 810 via the capacitor cp1 having a fourth largest capacitance of the binary weights and via the capacitor cp2. As a result, the comparison signal Vcmp increases by VRF/16, and thus the value of the comparison signal Vcmp becomes equal to VRF*3/16. Note that in the present specification, a symbol * is used to denote multiplication. The control circuit 820 determines, based on the comparison result given from the comparator 815, that the value of the analog signal Sin is larger than the value (VRF*3/16) of the comparison signal Vcmp, and thus the control circuit 820 maintains the level of the control signal supplied to the switch sw1 at the high level. As a result, the value of the comparison signal Vcmp is maintained at VRF*3/16. The comparison result means that the second bit of the value of the digital signal Sout is equal to 1.

Finally, the control circuit 820 changes the level of the control signal supplied to the switch sw0 to the high level. As a result, the reference voltage VRF is applied to the supply terminal SPL of the generation circuit 810 via the capacitor cp0 having fifth largest capacitance of the binary weights and via the capacitors cp1 and cp2. As a result, the comparison signal Vcmp increases by VRF/32, and thus the value of the comparison signal Vcmp becomes equal to VRF*7/32. The control circuit 820 determines, based on the comparison result given from the comparator 815, that the value of the analog signal Sin is smaller than the value (VRF*7/32) of the comparison signal Vcmp, and thus the control circuit 820 returns the level of the control signal supplied to the switch sw0 to the low level. As a result, the value of the comparison signal Vcmp returns to VRF*3/16. The comparison result means that the first bit of the value of the digital signal Sout is equal to 0.

Based on the result of the successive approximation performed in the above-described manner, the control circuit 820 determines that the digital signal Sout corresponding to the analog signal is 00110.

As described above, the ADC 360 capable of generating a digital signal corresponding to the input analog signal by performing the AD conversion. Other AD conversion method In the second embodiment, as an example, the ADC 360 using the successive approximation AD converter has been described. However, the ADC 360 is not limited to the successive approximation AD converter. Other types of AD converters, such as a ramp-compare ADC, a delta-sigma ADC, a pipeline ADC, a flash ADC, or the like may be employed.

Fourth Embodiment

FIG. 14 is a block diagram illustrating a configuration of an image capturing system 500 according to a fourth embodiment. The image capturing system 500 according to the present embodiment includes an image capturing apparatus 200 configured according to one of the embodiments described above. Specific examples of the image capturing system 500 include a digital still camera, a digital camcorder, a monitor camera, etc. FIG. 14 illustrates an example of a configuration of a digital still camera in which the image capturing apparatus according to one of the embodiments described above is used as the image capturing apparatus 200.

The image capturing system 500 illustrated by way of example in FIG. 14 includes the image capturing apparatus 200, a lens 5020 for forming an optical image of an object on the image capturing apparatus 200, an aperture 504 for adjusting the amount of light passing through the lens 5020, and a barrier 506 for protecting the lens 5020. The lens 5020 and the aperture 504 form an optical system that focuses light onto the image capturing apparatus 200.

The image capturing system 500 also includes a signal processing unit 5080 configured to perform processing on an output signal output from the image capturing apparatus 200. The signal processing unit 5080 performs signal processing to make various kinds corrections on the input signal as required, and outputs the resultant signal in a compressed format. The signal processing unit 5080 may have a function of performing an AD conversion process on the output signal output from the image capturing apparatus 200. In this case, the image capturing apparatus 200 does not necessarily need to internally include an AD conversion circuit.

The image capturing system 500 further includes a buffer memory unit 510 for temporarily storing image data, and an external interface unit (external I/F unit) 512 for communicating with an external computer or the like. The image capturing system 500 further includes a storage medium 514 such as a semiconductor memory or the like for storing and reading captured image data, and a storage medium control interface unit (storage medium control I/F unit) 516 for storing and reading data to or from the storage medium 514. The storage medium 514 may be installed inside the image capturing system 500 or the storage medium 514 may be removable.

The image capturing system 500 further includes a general control/calculation unit 518 that performs various calculations and controls the whole digital still camera, and a timing generator unit 520 that outputs various timing signals to the image capturing apparatus 200 and the signal processing unit 5080. The timing signals may be input from the outside. That is, the image capturing system 500 may include at least the image capturing apparatus 200, the signal processing unit 5080 for processing the output signal output from the image capturing apparatus 200. The general control/calculation unit 518 and the timing generator unit 520 may perform part or all of control functions of the image capturing apparatus 200.

The image capturing apparatus 200 outputs an image signal to the signal processing unit 5080. The signal processing unit 5080 performs a predetermined signal processing on the image signal output from the image capturing apparatus 200, and outputs the resultant image data. The signal processing unit 5080 generates an image using the image signal.

By configuring the image capturing system using the image capturing apparatus according to one of the embodiments described above, it is possible to realize the image capturing system capable of capturing an image with higher quality.

Fifth Embodiment

An image capturing system and a moving object according to a fifth embodiment are described below with reference to FIGS. 15A to 15D and 16.

FIGS. 15A to 15D are schematic diagrams illustrating a configuration of the image capturing system and the moving object according to the present embodiment. FIG. 16 is a flow diagram illustrating an operation of the image capturing system according to the present embodiment.

In the present embodiment, by way of example, the image capturing system is a vehicle-mounted camera. In FIGS. 15A to 15D, a vehicle system and an image capturing system installed in the vehicle system are shown by way of example. The image capturing system 701 includes an image capturing apparatus 702, an image pre-processing unit 715, an integrated circuit 703, and an optical system 714. The optical system 714 focuses an optical image of an object onto the image capturing apparatus 702. The image capturing apparatus 702 converts the optical image of the object focused via the optical system 714 to an electric signal. The image capturing apparatus 702 is an image capturing apparatus according to one of the embodiments described above. The image pre-processing unit 715 performs particular signal processing on the signal output from the image capturing apparatus 702. The function of the image pre-processing unit 715 may be embedded in the image capturing apparatus 702. The image capturing system 701 includes at least two sets each including the optical system 714, the image capturing apparatus 702, and the image pre-processing unit 715, and the output from the image pre-processing unit 715 of each set is input to the integrated circuit 703.

The integrated circuit 703 is an image capturing system-purpose integrated circuit, and includes an image processing unit 704 including a memory 705, an optical ranging unit 706, a parallax calculation unit 707, an object recognition unit 708, and an anomaly detection unit 709. The image processing unit 704 performs image processing such as a developing process, a defect correction, and/or the like on the output signal output from the image pre-processing unit 715. The memory 705 temporarily stores a captured image and stores a location of a defect image capturing pixel. The optical ranging unit 706 performs focusing of an image of an object and performs distance measurement. The parallax calculation unit 707 calculates a parallax (a phase difference between parallax images) from a plurality of pieces of image data acquired by the plurality of image capturing apparatuses 702. The object recognition unit 708 recognizes an object such as a vehicle, a road, a traffic sign, a person, and/or the like. When the anomaly detection unit 709 detects an anomaly in the image capturing apparatus 702, the anomaly detection unit 709 notifies the main control unit 713 of the anomaly.

The integrated circuit 703 may be realized using hardware designed for dedicated use, or may be realized using software modules, or may be realized by a combination thereof. The integrated circuit 703 may be realized by an FPGA (Field Programmable Gate Array), an ASIC (Application Specific Integrated Circuit), or the like, or by a combination thereof.

The main control unit 713 integrally controls operations of the image capturing system 701, a vehicle sensor 710, a control unit 720, etc. Alternatively, the main control unit 713 may not be provided, and the image capturing system 701, the vehicle sensor 710, and the control unit 720 each may have their own communication interface thereby transmitting/receiving control signals to/from each other via a communication network (according to, for example, the CAN standard).

The integrated circuit 703 has a capability of transmitting a control signal or a setting value to the image capturing apparatus 702 in response to receiving a control signal from the main control unit 713 or a control unit of the integrated circuit 703. For example, the integrated circuit 703 transmits a setting instruction/data for pulse-driving a voltage switch 13 in the image capturing apparatus 702, a setting instruction/data for switching the voltage switch 13 for each frame, or the like.

The image capturing system 701 is connected to the vehicle sensor 710 thereby detecting a vehicle running state in terms of a vehicle speed, a yaw rate, a steering angle, and/or the like, an environment outside the vehicle, and a state of another vehicle or an obstacle. The vehicle sensor 710 also functions as distance information acquisition unit for acquiring distance information indicating a distance to an object from parallax images. The image capturing system 701 is connected to a drive assist control unit 711 that performs various drive assists in terms of automatic steering, an automatic cruising, a collision avoidance function, and/or the like. In particular, in a collision judgment function, based on a detection result provided by the image capturing system 701 or the vehicle sensor 710, a judgment is made as to a prediction/occurrence of a collision with another vehicle or an obstacle. This makes it possible to perform a collision avoidance control when a collision is predicted and activate a safety apparatus when a collision occurs.

The image capturing system 701 is also connected to an alarm apparatus 712 that issues an alarm to a driver based on a judgment result made by a collision judgment unit. For example, in a case where a judgment result made by the collision judgment unit indicates that there is a high possibility that a collision occurs, the main control unit 713 controls a vehicle to prevent a collision or reduce a damage by braking, releasing the accelerator, reducing an engine output, or the like. The alarm apparatus 712 generates a warning sound or the like, displays warning information on a display screen of a car navigation system or a meter panel, or vibrates a sheet belt or a steering wheel thereby issuing an alarm to a user.

Figure 15A:
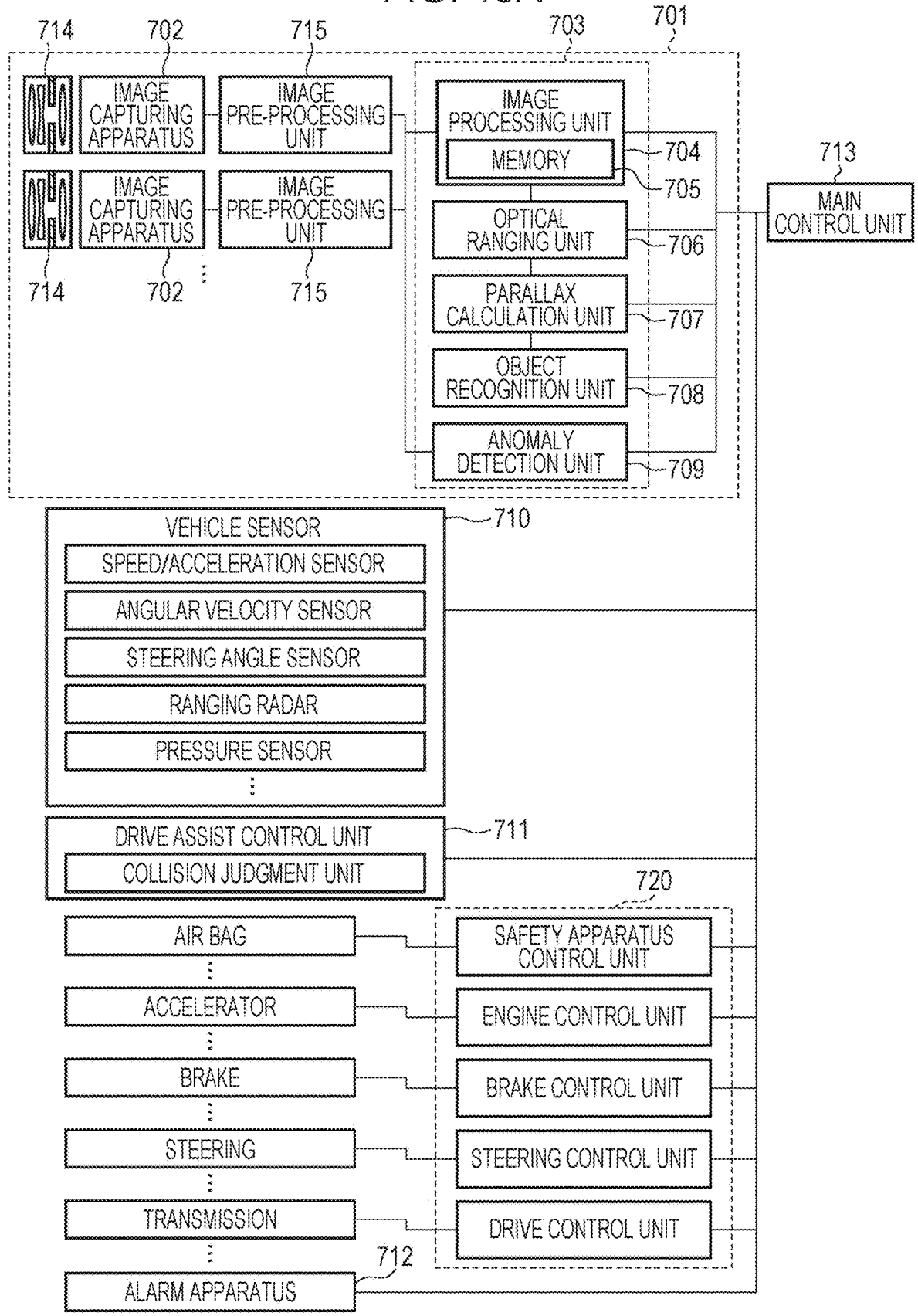
FIGS. 15A to 15D are diagrams illustrating a configuration of a moving object.
Figure 15B:
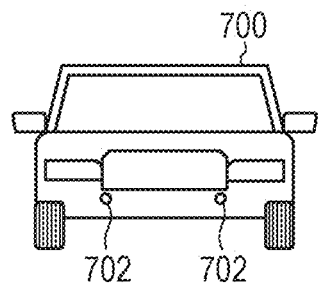
Figure 15C:
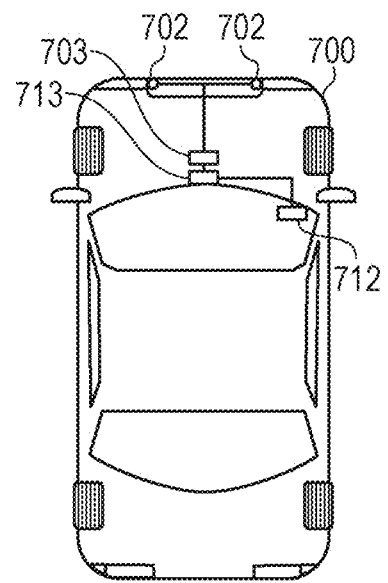
Figure 15D:
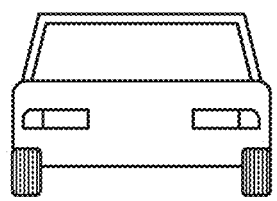

In the present embodiment, an image of a view surrounding a vehicle, for example, an image of a view ahead or behind the vehicle is captured by the image capturing system 701. FIGS. 15B to 15D illustrate an example of a manner of disposing the image capturing system 701 for a case where an image of a view ahead of a vehicle is captured by the image capturing system 701.

Two image capturing apparatuses 702 are disposed at font locations of a vehicle 700. More specifically, when a forward/backward running direction of the vehicle 700 or a center line of an external contour (for example, a center line of a vehicle width) of the vehicle 700 is regarded as an axis of symmetry, it is preferable to dispose the two image capturing apparatuses 702 at locations symmetric about the axis of symmetry. This arrangement is preferable in acquiring distance information indicating the distance between the vehicle 700 and a target object to be captured in image, or in judging the possibility of a collision. It is also preferable to dispose the image capturing apparatuses 702 such that the image capturing apparatuses 702 do not interfere with the view of the driver when the drivers views the state outside the vehicle 700 from a driver's seat. It is preferable to dispose the alarm apparatus 712 at a location that allows a driver to easily view the alarm apparatus 712.

Next, a failure detection operation of the image capturing apparatus 702 in the image capturing system 701 is described below with reference to FIG. 16. The failure detection operation is performed by the image capturing apparatus 702 according to steps S810 to S880 shown in FIG. 16.

In step S810, a start-up setting of the image capturing apparatus 702 is performed. That is, an instruction to make a setting of the operation of the image capturing apparatus 702 is transmitted from the outside (for example, the main control unit 713) of the image capturing system 701 or from the inside of the image capturing system 701, and, in response, the image capturing operation or the failure detection operation is started by the image capturing apparatus 702.

Next, in step S820, a pixel signal is acquired from an effective pixel. In step S830, an output value from a failure detection pixel provided for failure detection is acquired. As with the effective pixel, the failure detection pixel also includes a photoelectric conversion element. A predetermined voltage is written in the photoelectric conversion element. The failure detection pixel outputs a signal corresponding to the voltage written in the photoelectric conversion element. Note that step S820 and step S830 may be performed in a reversed order.

Next, in step S840, it is determined whether an expected output value from the failure detection pixel and an actual output value from the failure detection pixel are identical to each other.

In a case where the determination in step S840 indicates that the expected output value is identical to the actual output value, the process proceeds to step S850 in which it is determined that the image capturing operation is being performed normally, and the process proceeds to step S860. In step S860, pixel signals in a scanning row are transmitted to the memory 705 and temporarily stored therein. Thereafter, the process returns to step S820 and the failure detection operation is continued.

On the other hand, in a case where the determination in step S840 indicates that the actual output value is not identical to the expected output value, the processing flow proceeds to step S870. In step S870, it is determined that there is an abnormality in the image capturing operation, and an alarm is issued to the main control unit 713 or the alarm apparatus 712. The alarm apparatus 712 displays information indicating that the abnormality has been detected on the display unit. Thereafter, in step S880, the image capturing apparatus 702 is stopped, and the operation of the image capturing system 701 is ended.

In the present embodiment, by way of example, the processing flow described above with reference to the flow chart is iterated for each row. Alternatively, the processing flow may be iterated for a plurality of rows, or the failure detection operation may be performed for each frame.

In the issuing of the alarm in step S870, the alarm may be output to the outside of the vehicle via a wireless network.

In the present embodiment, the control is performed such that a collision with another vehicle is avoided. The embodiment is also applied to a control to perform automatic driving such that the vehicle runs following another vehicle, or such that the vehicle does not get off a traffic lane. Furthermore, the image capturing system 701 can be applied to vehicles such as cars, but may also be applied to, for example, moving objects (moving apparatuses) such as ships, aircrafts, industrial robots, etc. Furthermore, the image capturing system 701 may also be applied to a wide variety of apparatuses or devices using object recognition such as an intelligent transport system (ITS), etc.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-192049 filed Sep. 29, 2017, which is hereby incorporated by reference herein in its entirety.

What is claimed is:

1. An image capturing apparatus comprising:
a first chip including a plurality of pixels; and
a second chip stacked on the first chip and including a plurality of signal processing circuits arranged in a two-dimensional form,
each of the plurality of signal processing circuits including
a first selection circuit including a plurality of input nodes and a plurality of output nodes and configured such that a signal input from one of the pixels to one of the plurality of input nodes is selectively output to one of the plurality of output nodes,
a plurality of amplifier circuits respectively connected to the plurality of output nodes, and
an analog-to-digital conversion unit configured to convert a plurality of output signals output from the plurality of amplifier circuits,
wherein the first selection circuit operates such that in a period from a time at which a first signal is input to one of the plurality of amplifier circuits till a time at which a second signal different from the first signal is input to the one of the plurality of amplifier circuits, the first selection circuit inputs signals sequentially to the other ones of the plurality of amplifier circuits.

2. The image capturing apparatus according to claim 1, wherein a signal selected by the first selection circuit is input to the amplifier circuit.

3. The image capturing apparatus according to claim 1, wherein
each of the plurality of pixels includes a selection transistor,
the selection transistors sequentially turn from an off-state to an on-state, and
an interval in which the first selection circuit switches one output is longer than a period at a time the selection transistor of one pixel turns on till a time at which the selection transistor of a next pixel turn on.

4. The image capturing apparatus according to claim 1, wherein a reference voltage is supplied in common to the plurality of amplifier circuits.

5. The image capturing apparatus according to claim 4, wherein the first chip includes a pixel configured to output a reference signal.

6. The image capturing apparatus according to claim 1, wherein the signal processing circuit includes a second selection circuit configured to select one of a plurality of output signals output from the plurality of amplifier circuits and output the selected output signal to the analog-to-digital conversion unit.

7. The image capturing apparatus according to claim 6, wherein a number of inputs to the second selection circuit is smaller than a number of inputs to the first selection circuit.

8. The image capturing apparatus according to claim 1, wherein a number of the plurality of amplifier circuits is smaller than a number of inputs to the first selection circuit.

9. The image capturing apparatus according to claim 1, wherein the first chip includes a pixel configured to supply a reference voltage to one of the plurality of amplifier circuits.

10. The image capturing apparatus according to claim 1, wherein the plurality of pixels and the analog-to-digital conversion unit overlap with each other when seen in plan view.

11. The image capturing apparatus according to claim 1, wherein the analog-to-digital conversion unit includes a successive approximation analog-to-digital conversion circuit.

12. An image capturing system comprising:
the image capturing apparatus according to claim 1; and
a signal processing unit configured to generate an image by processing a signal output from the image capturing apparatus.

13. A moving object comprising:
the image capturing apparatus according to claim 1; and
a distance information acquisition unit configured to acquire distance information indicating a distance to an object based on a signal from the image capturing apparatus, the moving object further comprising a control unit configured to control the moving object based on the distance information.

14. An image capturing apparatus comprising:
a first chip including a plurality of pixels; and
a second chip stacked on the first chip and including a plurality of signal processing circuits arranged in a two-dimensional form,
each of the plurality of signal processing circuits including
a first selection circuit including a plurality of input nodes and a plurality of output nodes and configured such that a signal input from one of the pixels to one of the plurality of input nodes is selectively output to one of the plurality of output nodes,
a plurality of amplifier circuits respectively connected to the plurality of output nodes, and
an analog-to-digital conversion unit configured to convert a plurality of output signals output from the plurality of amplifier circuits,
wherein the signal processing circuit includes a second selection circuit configured to select one of a plurality of output signals output from the plurality of amplifier circuits and output the selected output signal to the analog-to-digital conversion unit.

15. A moving object comprising:
an image capturing apparatus;
a distance information acquisition unit configured to acquire distance information indicating a distance to an object based on a signal from the image capturing apparatus; and
a control unit configured to control the moving object based on the distance information,
wherein the image capturing apparatus including:
a first chip including a plurality of pixels; and
a second chip stacked on the first chip and including a plurality of signal processing circuits arranged in a two-dimensional form,
each of the plurality of signal processing circuits including
a first selection circuit including a plurality of input nodes and a plurality of output nodes and configured such that a signal input from one of the pixels to one of the plurality of input nodes is selectively output to one of the plurality of output nodes,
a plurality of amplifier circuits respectively connected to the plurality of output nodes, and
an analog-to-digital conversion unit configured to convert a plurality of output signals output from the plurality of amplifier circuits.

16. The moving object according to claim 15, wherein the first selection circuit operates such that in a period from a time at which a first signal is input to one of the plurality of amplifier circuits till a time at which a second signal different from the first signal is input to the one of the plurality of amplifier circuits, the first selection circuit inputs signals sequentially to the other ones of the plurality of amplifier circuits.

17. The moving object according to claim 16, wherein
each of the plurality of pixels includes a selection transistor,
the selection transistors sequentially turn from an off-state to an on-state, and
an interval in which the first selection circuit switches one output is longer than a period at a time the selection transistor of one pixel turns on till a time at which the selection transistor of a next pixel turn on.

18. The moving object according to claim 15, wherein the signal processing circuit includes a second selection circuit configured to select one of a plurality of output signals output from the plurality of amplifier circuits and output the selected output signal to the analog-to-digital conversion unit.

19. The moving object according to claim 15, wherein the first chip includes a pixel configured to supply a reference voltage to one of the plurality of amplifier circuits.

20. The moving object according to claim 15, wherein the plurality of pixels and the analog-to-digital conversion unit overlap with each other when seen in plan view.

* * * * *